May 1, 1962 V. F. LANG 3,031,672
MACHINE FOR MAKING TIE RODS
Filed Jan. 9, 1957 10 Sheets-Sheet 1
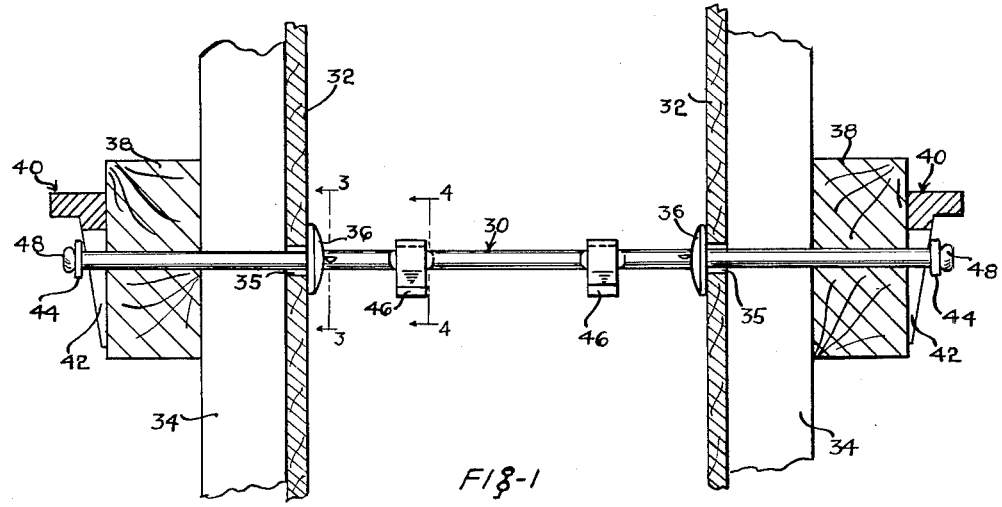
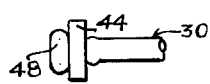
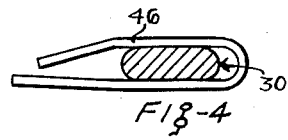
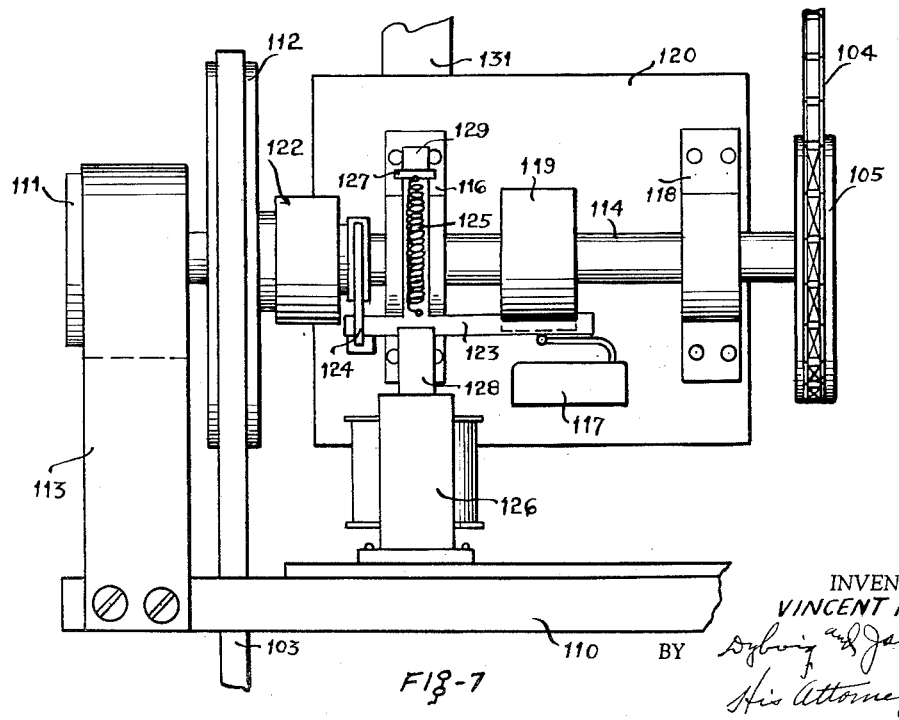
INVENTOR.
VINCENT F. LANG
BY
His Attorneys May 1, 1962   V. F. LANG   3,031,672
MACHINE FOR MAKING TIE RODS
Filed Jan. 9, 1957   10 Sheets-Sheet 2
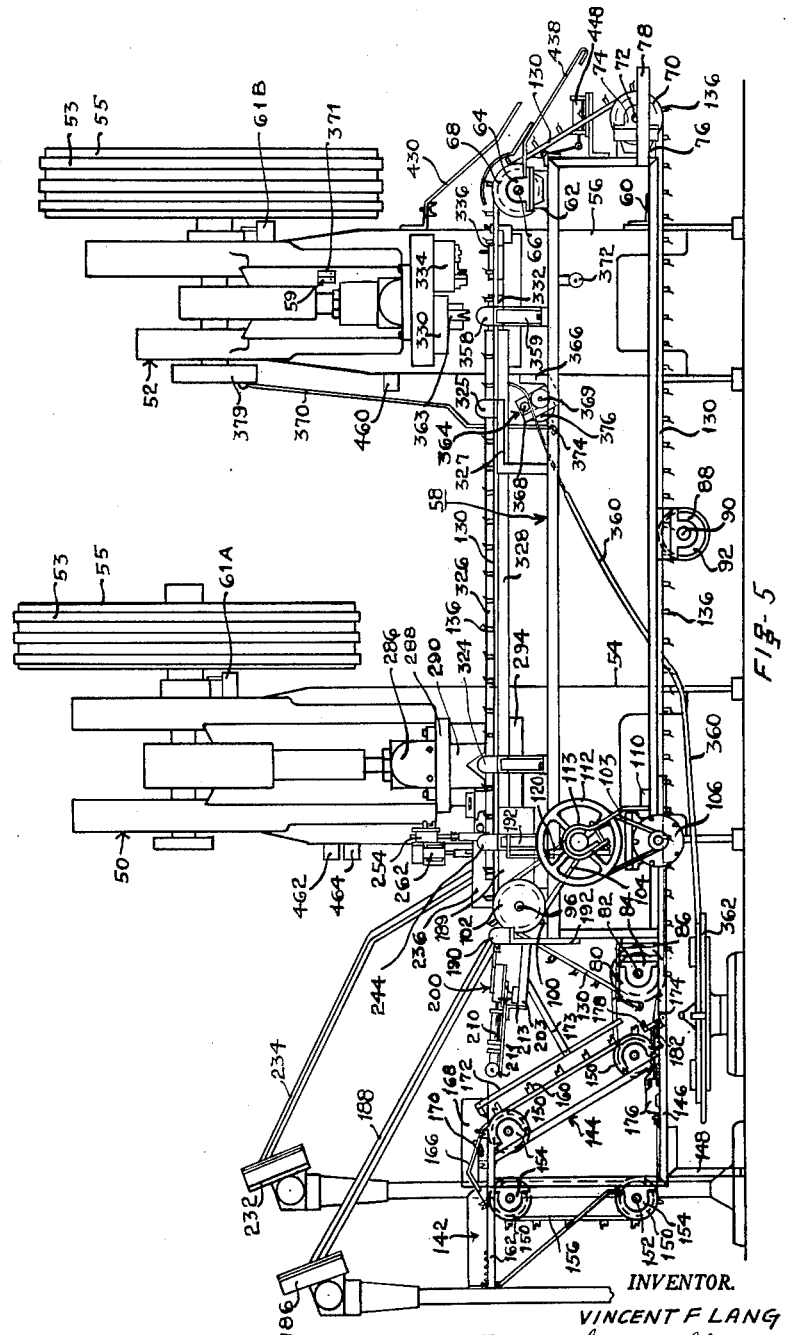
INVENTOR.
VINCENT F LANG
BY
His Attorneys May 1, 1962 V. F. LANG 3,031,672
MACHINE FOR MAKING TIE RODS
Filed Jan. 9, 1957 10 Sheets-Sheet 3

INVENTOR.
VINCENT F LANG
BY
His Attorneys

INVENTOR.
VINCENT F LANG

May 1, 1962 V. F. LANG 3,031,672
MACHINE FOR MAKING TIE RODS
Filed Jan. 9, 1957 10 Sheets-Sheet 5
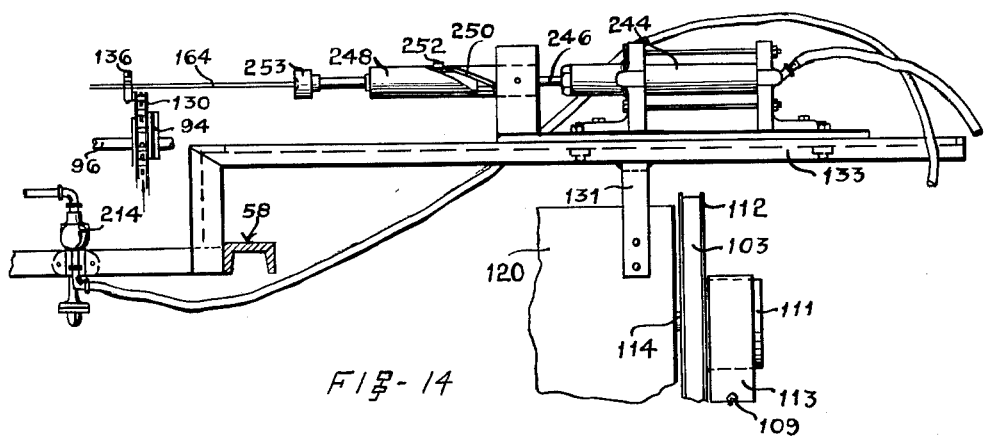
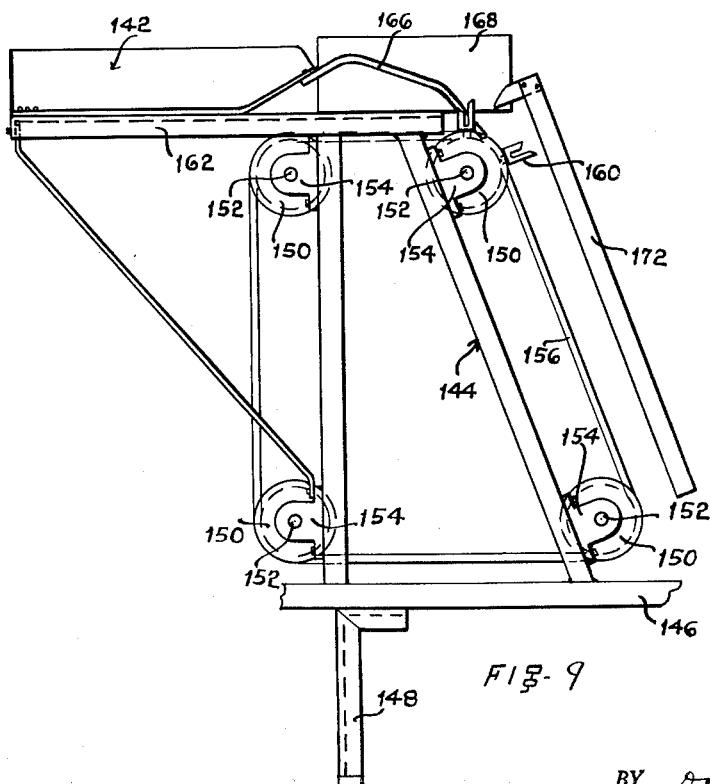
INVENTOR.
VINCENT-F-LANG
BY Dybvig and Jacox
His Attorneys May 1, 1962 V. F. LANG 3,031,672
MACHINE FOR MAKING TIE RODS
Filed Jan. 9, 1957 10 Sheets-Sheet 6
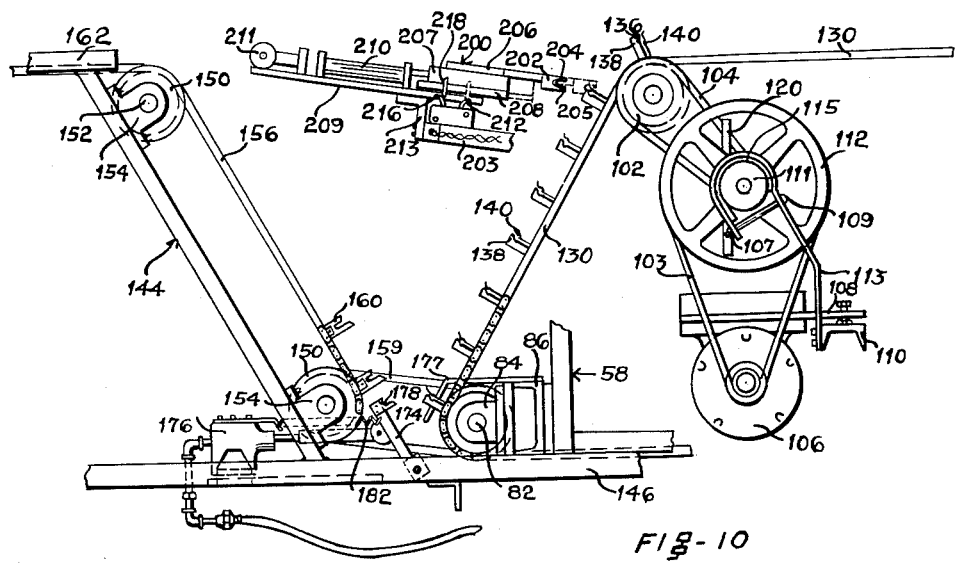
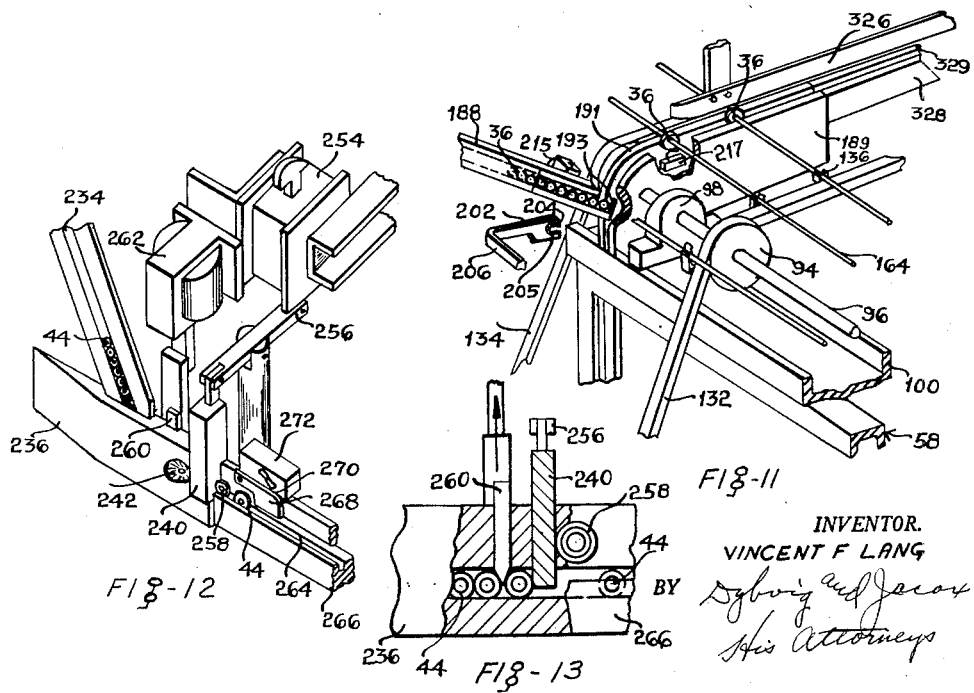
INVENTOR.
VINCENT F. LANG

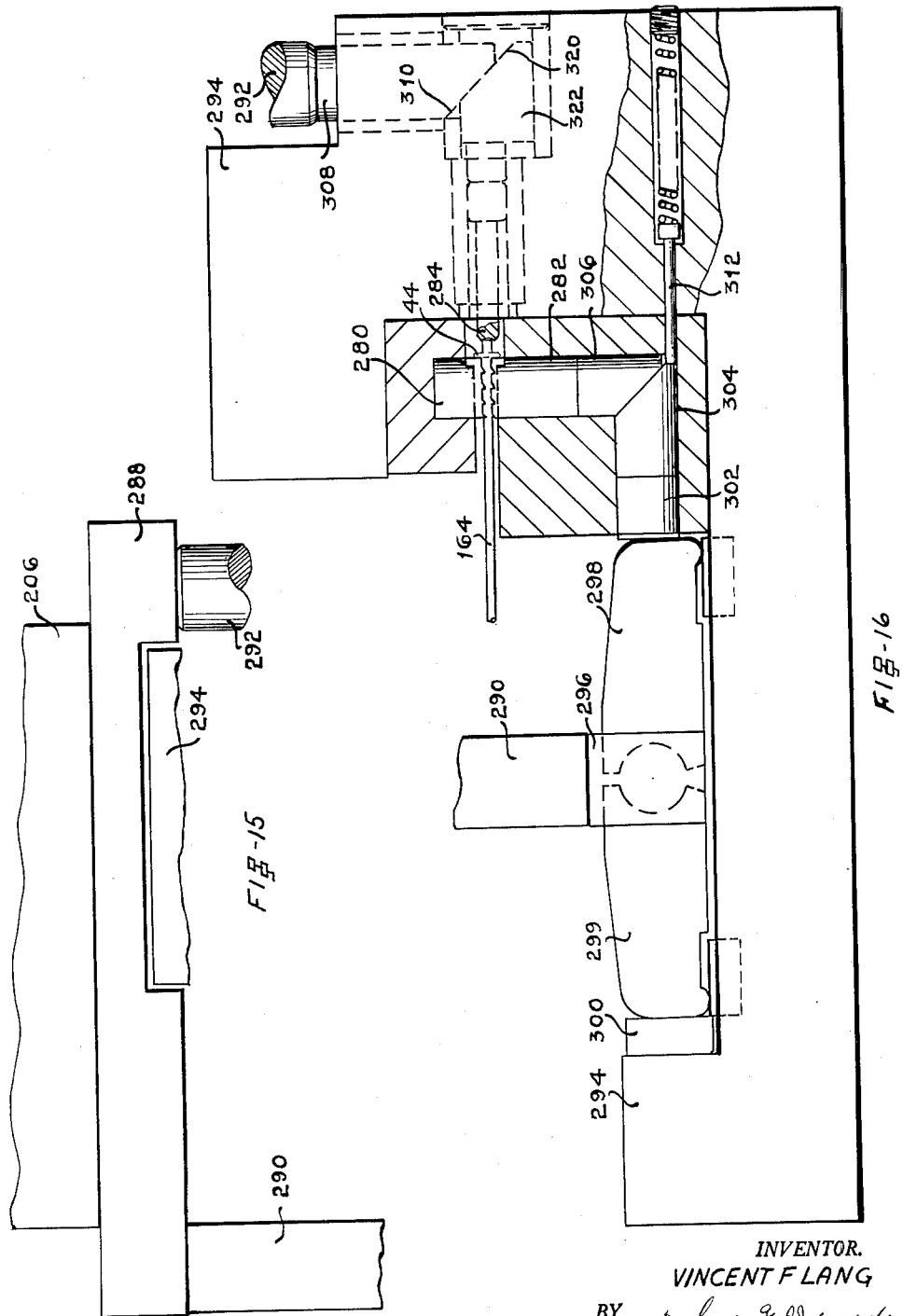

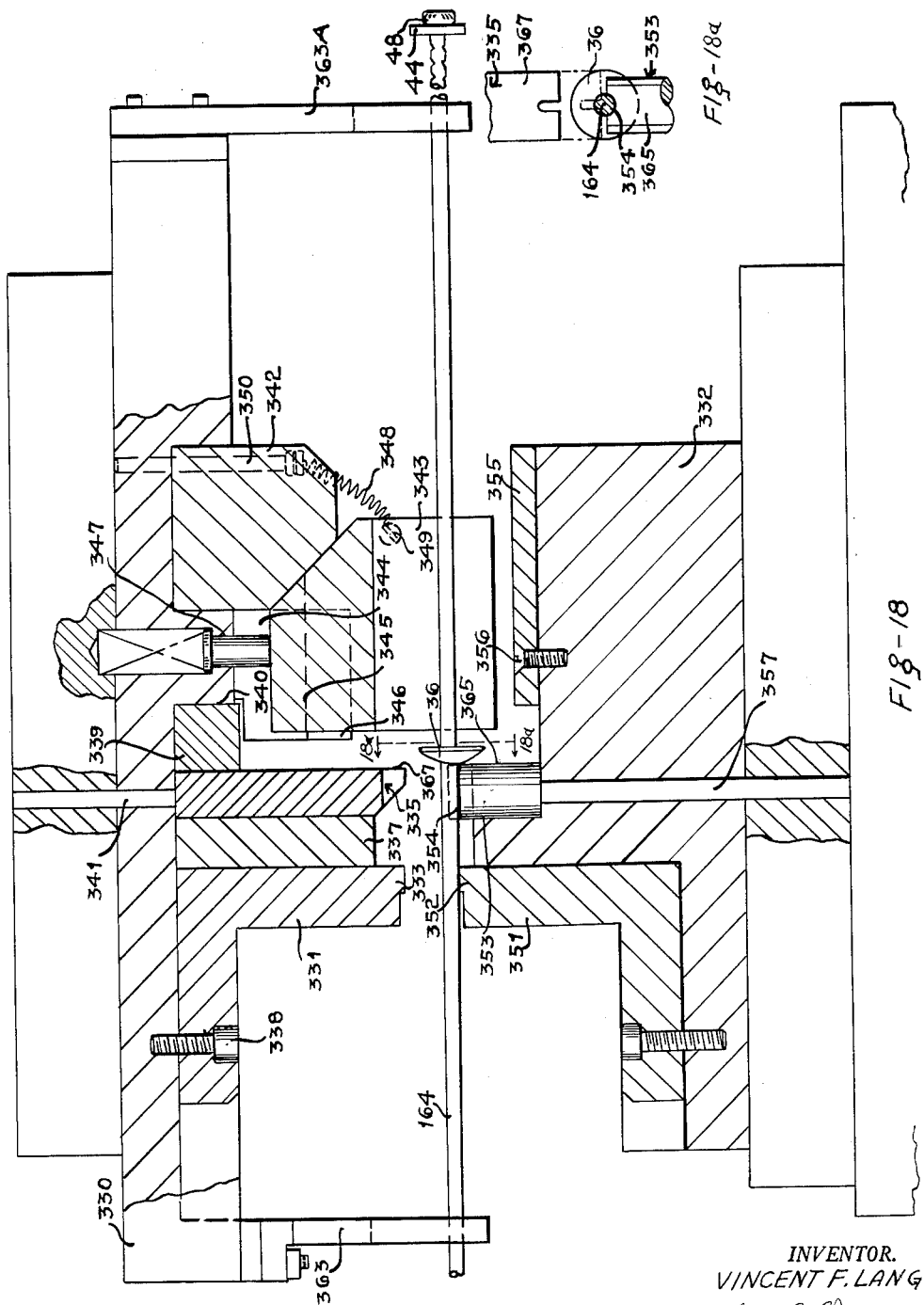

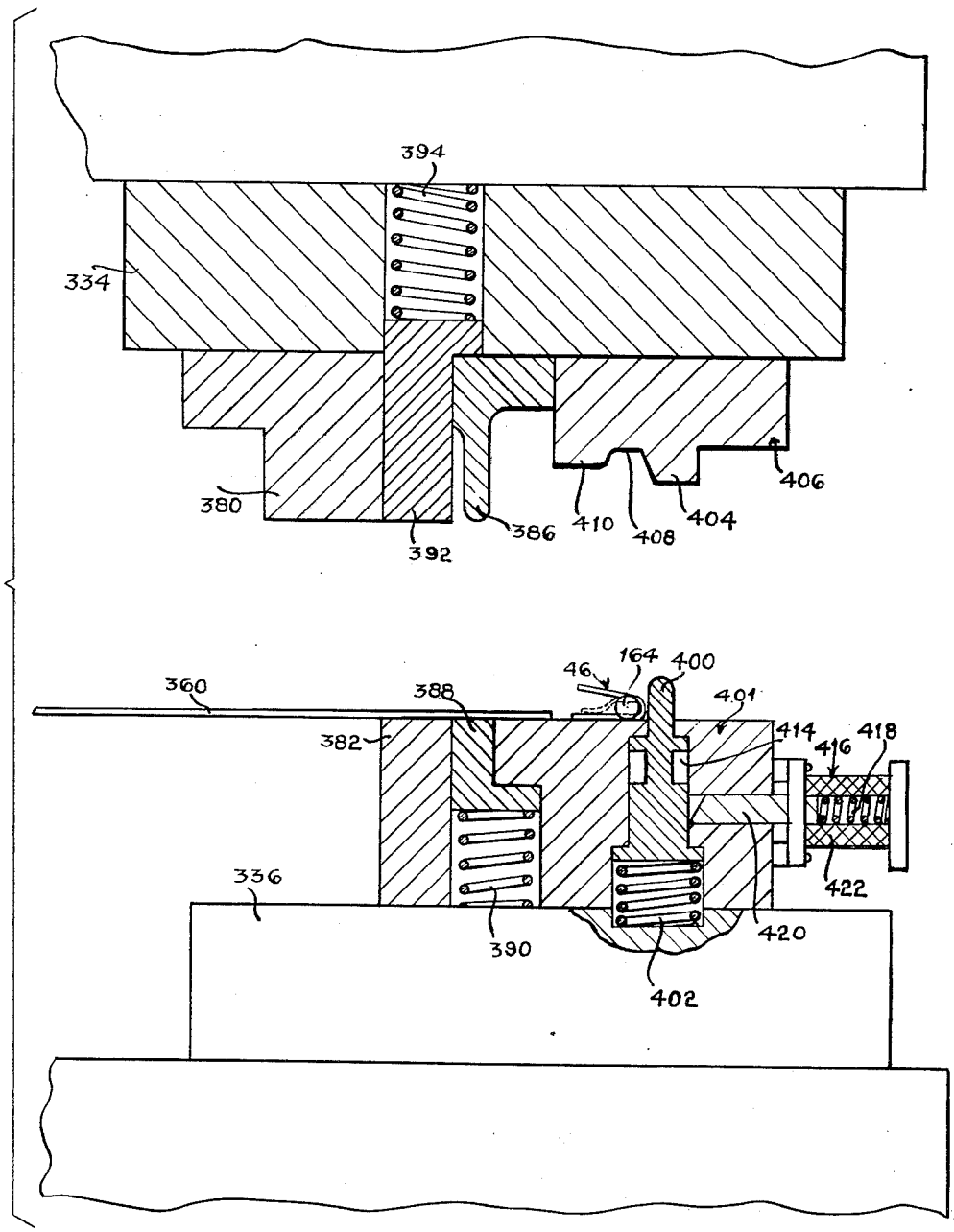

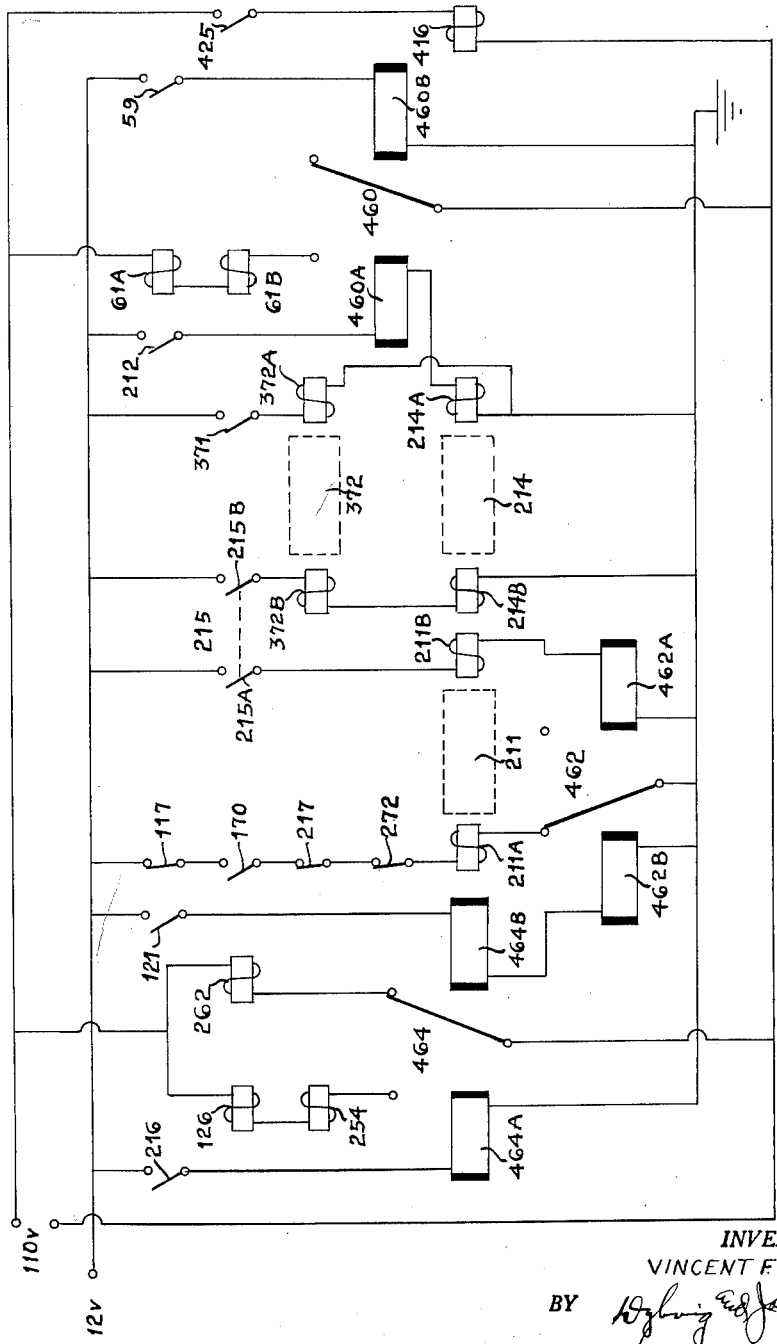

United States Patent Office 3,031,672
Patented May 1, 1962

3,031,672
MACHINE FOR MAKING TIE RODS
Vincent F. Lang, 504 Kercher St., Miamisburg, Ohio
Filed Jan. 9, 1957, Ser. No. 633,321
12 Claims. (Cl. 1—165)

This invention relates to a machine for making tie rods useful in assembling forms for concrete wall foundations or the like, and more particularly to a machine for automatically performing a sequence of operations culminating in the fabrication of a tie rod, although the invention is not necessarily so limited.

An object of this invention is to provide a machine for making tie rods useful in the assembly of forms for concrete foundations.

Another object of this invention is to provide, in a rod forming machine, conveyor means for advancing rods through a sequence of forming operations and drive means for operating the conveyor means in synchronization with the forming elements of the machine.

Another object of this invention is to provide, in a rod forming machine, means for projecting a rod, while simultaneously twisting the rod, into the aperture of a washer, and means for securing the washer to the rod at a predetermined position on the rod.

A further object of this invention is to provide, in a rod forming machine, a progressive die for cutting a metallic band to length and for wrapping the band around a rod.

Still another object of this invention is to provide a single machine, means for advancing rods through the machine, means for placing a washer on each rod, means for upsetting one end of each rod, means for staking a washer on each rod, means for flattening a portion of each rod, means for wrapping a metallic band around each rod, and means for ejecting each rod from the machine.

Still another object of this invention is to provide electric circuitry for synchronizing the operation of the aforesaid machine and suitable control elements for detecting failure in the various operations performed by the machine.

Other objects and advantages reside in the construction of parts, the combination thereof, the method of manufacture and the mode of operation, as will become more apparent from the following description.

In the drawings,

FIGURE 1 is an elevational view of a tie rod fabricated by a machine of this invention, with parts shown in section. Illustrating one application of the tie rod.

FIGURE 2 is an enlarged fragmentary elevational view of one end of the tie rod.

FIGURE 3 is an enlarged sectional view taken substantially along the line 3—3 of FIGURE 1.

FIGURE 4 is an enlarged sectional view taken substantially along the line 4—4 of FIGURE 1.

FIGURE 5 is a front elevation of the machine of this invention.

FIGURE 7 is an enlarged fragmentary elevation view of the control mechanism for the conveyor drive.

FIGURE 9 is an enlarged fragmentary front elevational view of the auxiliary conveyor assembly.

FIGURE 10 is an enlarged fragmentary front elevational view showing a shuttle mechanism for moving rods from the auxiliary conveyor assembly to the main conveyor assembly. The figure also shows a guide for guiding the rods in one of the fabrication operations.

FIGURE 11 is an enlarged fragmentary perspective view of an assembly for attaching a first washer to a rod carried by the main conveyor assembly.

FIGURE 12 is an enlarged fragmentary perspective view of an assembly for attaching a second washer to a rod carried by the main conveyor assembly.

FIGURE 13 is a fragmentary elevation of a portion of the assembly of FIGURE 12, with parts shown in section.

FIGURE 14 is an enlarged fragmentary elevational view of a pair of air cylinders mounted upon the machine, and of a valve for regulating the operation of the air cylinders.

FIGURE 15 is an enlarged fragmentary elevation view of a die shoe.

FIGURE 16 is an enlarged fragmentary elevation view of a die shoe complementing the die shoe of FIGURE 15, with parts shown in section.

FIGURE 18 is an enlarged fragmentary sectional view of a portion of upper and lower die elements operated by the punch press of FIGURE 17, with parts shown in section.

FIGURE 18A is an enlarged fragmentary front elevational view showing staking die elements operated by the punch press of FIGURE 17.

FIGURE 19 is an enlarged fragmentary sectional view of another portion of upper and lower die elements operated by the punch press of FIGURE 17.

FIGURE 21 is a schematic circuit diagram illustrating the circuitry for synchronizing the operation of the machine of this invention.

Figure 17:
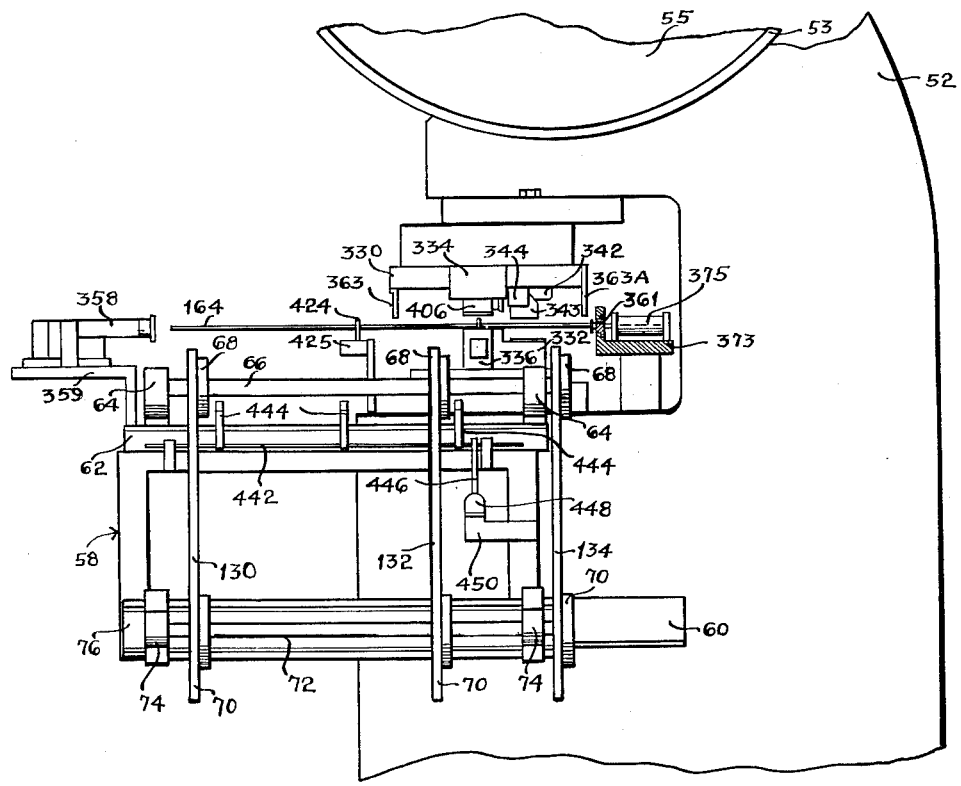
FIGURE 17 is an enlarged fragmentary side elevational view of a punch press associated with the machine of this invention.

Referring to the drawings in detail, the tie rod fabricated by the machine of this invention is illustrated at 30 in FIGURE 1. Also illustrated in FIGURE 1 is a typical structure which may be employed in combination with the tie rods for providing a form for concrete walls or foundations.

The form structure includes a pair of opposing upright wall portions each comprising boards or plywood sheets 32 supported by upright studs 34. The wall portions are provided with suitably spaced holes 35 through which the ends of the rods 30 may be projected. Washers 36 secured to each rod 30 in spaced relation, engage the inner surfaces of the opposing wall portions so as to properly space the wall portions.

The spaced wall portions are braced with sturdy wooden beams 38, which extend horizontally above and below the rods 30. The beams 38 are retained by wedges 40, each wedge having a bifurcated portion 42 adapted to fit about the rod 30. The wedges 40 engage washers 44 secured to the ends of the rods 30. Clearly, the washers 44 must be smaller in diameter than the washers 36 if the washers 44 are to be projected through the holes 35 which in turn, are too small to accept the washers 36.

The space between the wall portions is provided for receipt of concrete or the like. When the concrete has been poured and has set, the forms are removed by knocking out the wedges 40, whereupon the structure may be readily disassembled. The ends of the rods 30 projecting out of the formed concrete wall are broken off by grasping the ends and flexing the rod 30 until the rod breaks. To facilitate breakage of the rod 30, the rod is flattened, as shown in FIGURE 4, to weaken the rod at preselected points. The weakened points are placed approximately one inch within the formed concrete to insure that when the rod is broken off, no portion of the remaining rod, projects beyond the wall surface.

Metallic straps 46 are wrapped around the flattened portions of the rod 30 to anchor the rod 30 within the concrete wall so as to insure that, when the ends of the rod 30 are twisted or flexed to break the rod, the central portion of the rod does not also twist within the concrete making breakage more difficult.

It will be noted in FIGURE 2 that the washers 44 are secured to the rod 30 by upsetting the ends of the rod 30 creating a bulge 48 adjacent each washer 44. During the upsetting operation, which will be described in detail in the following, the portion of the rod 30 projecting through the washer 44 swells to engage and retain the washer 44 such that the washer cannot slide upon the rod 30.

As shown in FIGURE 3, the washers 36 are secured to the rod 30 by staking, or indenting, the body of the rod 30 so as to cause the metal projecting through the washer 36 to expand and engage the washer 36. Thus, the washer 36 is also rigidly retained by the rod 30.

The particular design of the tie rods 30, as well as the manner in which they are employed is old in the construction art, and is included in the present description only to identify the functional elements of the rod.

The machine for forming the tie rods 30 is illustrated schematically in its entirety in FIGURE 5. FIGURES 6 through 20 illustrate in detail the various components of the machine.

The rod forming machine is constructed upon two similar punch presses 50 and 52 shown in FIGURE 5. The punch presses are supported at a convenient elevation by suitable base structures 54 and 56. Fixedly mounted in front of the presses 50 and 52 is a substantially rectangular frame 58 comprised of welded U-shaped channel bar stock and supported by angle irons such as shown at 60, the angle irons being rigidly welded or bolted to the bases 54 and 56 of the punch presses. Openings in the rear side of the rectangular frame 58 admit the punch presses so that the presses may project partially into the rectangular frame.

Mounted on top of the frame 58 at the extreme right hand end as viewed in FIGURE 5 is a steel channel bar 62 carrying aligned journals 64 thereon for supporting a horizontal shaft 66. The shaft 66 carries three spaced chain engaging sprockets 68, as may be seen in FIGURE 6. In an analagous manner, as shown in FIGURE 5, three spaced chain engaging sprockets 70 are mounted upon a shaft 72 supported by journals 74 mounted upon a channel bar 76 secured to the frame 58 on the lower right hand end thereof as viewed in FIGURE 5. A U-shaped guard bracket 78 secured to the frame 58 protects workmen from the exposed sprockets 70. Also, sprockets 80 are carried by a shaft 82 journalled in journals 84 mounted upon a channel bar 86 secured to the frame 58 on the lower left hand end of the frame as viewed in FIGURE 5.

Intermediate the ends of the frame 58 on the lower portion thereof are a pair of journals 88 supporting a shaft 90 which carries three spaced sprockets 92. The several sprockets thus far described are idling sprockets for supporting parallel endless chains traveling around the rectangular frame 58.

Drive sprockets 94 are mounted on the upper portion of the frame 58 at the extreme left hand end thereof as viewed in FIGURE 5. The drive sprockets 94 as shown in FIGURE 11, are supported upon a driven shaft 96 mounted in journals 98 secured to a U-shaped channel member 100 mounted upon the frame 58.

The driven shaft 96 also supports a driven sprocket 102 connected by an endless chain 104 to a sprocket 105, associated with the chain drive mechanism shown in FIGURES 5, 7, 10, and 14. The chain drive mechanism will now be described in detail.

As shown in FIGURE 10 the chain drive mechanism comprises an electric motor 106 secured by a suitable bracket 108 to an arm 110 projecting from the rectangular frame 58. A V-belt drive 103 connects the electric motor output shaft to a flywheel 112 mounted upon a shaft 114, as shown in FIGURE 7, journalled for rotation in suitable journals 116 and 118 mounted upon a plate 120. The plate 120 is supported by a bracket 131, as shown in FIGURE 14, secured to an arm 133 ultimately connected to the frame 58. The flywheel 112 is connected to the shaft 114, which drives the conveyor assembly, through a clutch 122, as shown in FIGURE 7, the clutch being actuated by an arm 124 which in turn is operated by a solenoid 126. The solenoid 126 includes an armature 128 which engages and operates reciprocally a T-bar 129.

The T-bar 129 is supported for reciprocal vertical movement by an arm 127 secured at one end to the journal 116. A return spring 125 biases the T-bar away from the solenoid 126.

One end of a cross-member 123 of the T-bar 129 engages and operates the clutch actuating arm 124 while the other end of the cross-member 123 rides upon the periphery of a notched cylindrical drum 119 which is secured to the shaft 114 so as to rotate therewith. The drum 119 functions as a cam such that while the cross-member 123 engages the notched portion of the drum, the clutch 122 is disengaged and the flywheel 112 rotates freely of the shaft 114, and while the cross-member 123 engages the periphery of the drum 119, the clutch 122 is engaged such that the flywheel 112 drives the shaft 114.

In operation, the conveyor assembly is at rest while the cross-member 123 engages the notched portion of the drum 119, this being the condition illustrated in FIGURE 7. As will be described in detail subsequently, the solenoid 126 is energized at the termination of the machine operating cycle whereupon the T-bar 129 is driven vertically down causing the clutch 122 to engage such that the flywheel 112 drives the shaft 114. When the T-bar is moved downwardly, bar 123 moves out of the notch in member 119 so as to permit rotation thereof. Simultaneously, the cross-member 123 engages a safety microswitch 117, the operation of which will be described subsequently.

When the conveyor assembly driven by the shaft 114 has traveled a fixed distance, a second microswitch 121, shown in FIGURE 6, triggered by one of the moving rods, deenergizes the solenoid 126 through a circuit to be described subsequently. As a result, the cross-member 123 is permitted to rise vertically to engage the periphery of the drum 119. The shaft 114 continues to rotate until the cross-member 123 engages the notched portion of the drum 119 whereupon the clutch 122 is disengaged and the flywheel 112 rotates freely of the shaft 114, the conveyor assembly coming to rest. At the same time, the microswitch 117 is disengaged.

Throughout the following description, the distance the chains are advanced by the drive mechanism will be designated unit distance. This distance corresponds to one revolution of the shaft 114.

It is essential, as the cross-member 123 engages the notched portion of the drum 119 that the conveyor assembly comes quickly to rest for if the momentum of the conveyor assembly is too great, the cross-member 123 will be thrown out of engagement with the notch portion of the drum 119 causing the clutch 122 to engage once again with the result that the conveyor assembly will move erratically through more than the desired unit distance. To prevent this, a permanent breaking force is applied to the shaft 114. The breaking device includes a brake drum 111 carried by the shaft 114 at one end of thereof as shown in FIGURE 10. The break drum 111 is engaged by a brake lining 115 supported by a metallic strap 113 secured to the supporting arm 110 for the chain drive motor. The metallic strap 113 and supported brake lining 115 are wrapped partly around the drum 111 such that a threaded bolt 109 engaging the strap 113 at its end and at an intermediate point may be tightened with a nut 107 to increase the braking tension. The braking tension is made sufficient to almost instantaneously stop the conveyor assembly as the clutch 122 disengages.

The main conveyor assembly mounted and driven in the aforesaid manner is adapted to convey a plurality of rods through a sequence of forming operations. The arrangement of spaced rods on the top of the frame 58 is illustrated in FIGURE 6. As best seen in FIGURE 10 each of three chains 130, 132, and 134 is provided with a plurality of rod engaging clips 136. The clips 136 are secured to one side of each chain 130, 132, and 134 so as not to interfere with the motion of the chains over the several sprockets. The chains are aligned one with respect to the other such that rods supported by the clips 136 may be oriented normally with respect to the direction of travel of the chains. With reference to the aforesaid chain drive mechanism, the clips 136 are one unit distance apart such that the spacing between the clips 136 is equal to the distance the conveyor chains travel in response to operation of the chain drive mechanism.

Each clip 136, as illustrated in FIGURE 10, includes a notched supporting element 138 and a spring steel retaining element 140 secured thereto, the latter element operating to yieldingly press the rod to be carried by the clip into the notched portion of the supporting element 138.

Figure 8:
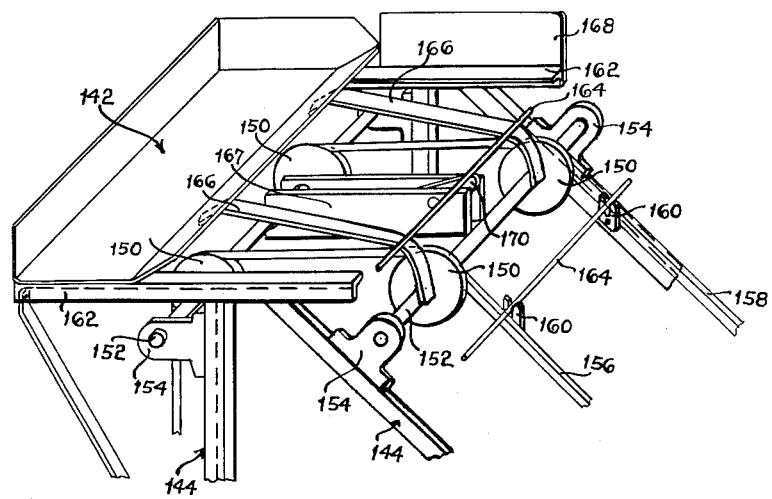
FIGURE 8 is an enlarged fragmentary perspective view of a rod hopper and auxiliary conveyor assembly.

Rods are fed to the conveyor assembly in semi-automatic fashion from a hopper assembly including a hopper 142 and an auxiliary conveyor assembly shown at the extreme left in FIGURE 5, and in greater detail in FIGURES 8, 9, and 10. The auxiliary conveyor assembly is mounted upon a substantially trapezoidal frame 144 formed from U-shaped channel bar stock. The frame 144 is secured in spaced relation to the frame 58 of the main conveyor assembly by channel bars 146 joining the lower portions of both conveyor assemblies, and supported at the proper vertical height by suitable legs 148.

As best seen in FIGURE 9, four pairs of spaced sprocket wheels 150 are mounted upon shafts 152 journalled in journals 154 secured at the ends of the vertically oriented sides of the trapezoidal frame 144. The spaced pairs of sprockets engage two parallel endless chains 156 and 158 encircling the frame 144. The chains 156 and 158 are driven by a chain and sprocket assembly 159 operating between the shaft 82 at the lower left end of the frame 58 and the shaft 152 at the lower right end of the frame 144 as illustrated in FIGURE 10. In this manner, the auxiliary conveyor assembly is driven by and in synchronism with the main conveyor assembly. Carried by the parallel chains 156 and 158 of the auxiliary conveyor assembly are a plurality of bifurcated rod holders 160, the rod holders being oriented upon the chains in such a manner that they cooperate to support a plurality of rods in spaced relation and normally disposed to the direction of travel of the chains. The spacing between the rod holders 160 is one unit distance.

The hopper 142 is mounted upon angle bars 162 forming the top side of the frame 144 and projecting laterally therefrom, the hopper 142 being a three sided sheet metal pan having a substantially rectangular base adapted to receive rods 164. The rods comprise pre-cut rod stock which is to be fabricated into the tie rods 30. Although automatic means may readily be devised for moving the rods 164 from the hopper 142 to the rod holders 160, it is preferred in the present device to move the rods manually to the rod holders. The reasons for this will become more apparent as the device is more fully described.

Suitable runners 166 extending from the hopper 142 parallel to the chains 156 and 158, and a baffle 168 are employed to enable the operator to manually position the rods 164 upon the rod holders 160.

A switch 170 shown in FIGURE 8, supported between the runners 166 by plates 167 is actuated by each rod 164 as the rod is guided manually into proper position by the runners 166. The switch 170 initiates one cycle of forming operations. The synchronism of the conveyor movement with the forming operations will be described more fully in the following, however, it is now emphasized that at the beginning and end of each operating cycle, the conveyor chains are at rest and will remain at rest after the termination of each cycle until the switch 170 is actuated, signaling, in effect, that a new rod has been added to the auxiliary conveyor assembly.

With successive operating cycles, the rods 164 on the auxiliary conveyor assembly are advanced from the hopper 142 down the inclined side to the right of the frame 144 as viewed in FIGURE 8. Suitable guide rails 172 extending parallel to this inclined side cooperate to prevent movement of the rods 164 out of the rod holders 160 as the rods are intermittently advanced downward. The guide rails are secured to a channel member 203 by brackets 173. The channel member 203 engages, in turn, a bracket 192 supported by the frame 58. As the rods advance over the sprocket wheels 150 disposed in the lower right corner of the frame 144, as viewed in FIGURE 10, they are engaged by a pivotally mounted shuttle assembly which operates to convey the rods 164 to the main conveyor assembly. The shuttle assembly will now be described in detail.

The shuttle assembly shown in FIGURE 10 includes a pivotally mounted arm 174 disposed between the chains 156 and 158. The arm 174 is actuated by an air cylinder 176 between two extreme positions, one in alignment with the auxiliary conveyor assembly and the other in alignment with the main conveyor assembly. The arm 174 is provided with a notched end portion 178 adapted to receive a rod 164.

The arrangement of parts is such that, at the termination of each forming cycle a rod 164 carried by the auxiliary conveyor assembly is in proper position to be engaged by the notched portion 178 of the arm 174, and clips 136 of the main conveyor assembly are properly positioned to receive a rod 164 carried by the arm 174. As will be described in detail in the following, air is admitted to the air cylinder 176 at a predetermined instant in the forming cycle while the conveyor assemblies are at rest. When the air cylinder is actuated, the arm 174 is pivoted such that a rod 164 is moved from the auxiliary conveyor assembly to the chains 130 and 132 of the main conveyor assembly. A bracket 177 is employed to stop the rod 164 in proper alignment with the clips 136. The air cylinder 176 remains actuated until deenergized as will be described later whereupon a return spring 182 restores the arm 174 to its initial position. The rods 164 after transferal to the main conveyor assembly are advanced cyclicly upon the main conveyor assembly.

Referring to FIGURES 5, 10, 11, and 14, as the rods 164 approach the drive sprockets 94 at the upper left of the frame 58 a first operation is performed in which the rod is projected into the opening of a first washer 36 so as to mount the washer upon the rod. The elements for performing this operation will now be described in detail.

The washers 36, which are substantially conical in shape, are supplied to the first washer receiving station by an automatic feeder hopper 186, of the conventional rotary type, through a conventional track 188. The width of the track, in comparison to the thickness of the washers 36 is such that two washers 36 cannot overlap within the track 188.

The track 188 engages a pair of spaced parallel guides or flanges 189 and 191 secured to the U-shaped channel member 190, while a portion 193 of the track 188 projects between the flanges 189 and 191 to provide a stop for the end washer 36 in the track 188. The arrangement is such that the end washer 36 in the track is supported in alignment with a rod 164, while the conveyor assembly is at rest, the track 188 being open adjacent the end washer 36 to permit the rod 164 in alignment therewith to be projected through the washer. It is to be noted, as shown in FIGURE 6, that the flanges 189 and 191 are situated between the chains 132 and 134.

The rod 164 is propelled through the end washer 36 with an air cylinder 190 similar to that shown at 244 in FIGURE 14. The air cylinder 244 actuates a shaft 246 journalled in a cylindrical bearing 248. The bearing 248 is provided with a helical slot 250 which cooperates with a pin 252 secured to the shaft 246 to rotate the shaft 246 as the shaft is driven axially. The shaft 246 terminates in a head 253 having a conical depression in the face thereof. The apex of the conical depression is fluted to provide teeth for gripping the rod. This fluted portion may be obtained by recessing a suitable chamfering tool in the head 253. When the air cylinder 244 is energized, the shaft 246 is driven axially and simultaneously rotated, the head 253 advancing upon the end of a rod 164 in alignment therewith. As the head 253 carrying the chamfering tool engages the rod, the rod is rotated and simultaneously driven axially. The air cylinder 190 shown in FIGURE 5 is mounted upon a suitable bracket 192 secured to the frame 58 in position to engage and rotate the rod 164, advancing the rod 164 toward the washer 36, the rod 164 sliding in the clips 136.

A guide 200 is provided for guiding the rod 164 into the washer 36. The guide, shown in FIGURE 10, comprises a guiding head 202 carrying a slotted portion 204 having beveled margins at 205, the latter guiding the rod 164 into the slotted portion. The head 202 is mounted upon a bracket 206 supported by a block 207 adapted to slide upon a track 208. The block 207 is actuated between two extreme positions, one shown in broken line in FIGURE 10, by an air cylinder 210 mounted along with the track 208 upon a bar 209 secured by an angle bracket 213 to a channel bar 203 carried by the frame 58.

In the rest position of the bracket 206, shown in solid lines in FIGURE 10, the guiding head 202 is inoperative. Upon actuation of the switch 170, signaling the addition of a new rod to the auxiliary conveyor, the air cylinder 210 is actuated through operation of a solenoid air valve 211, positioned behind the cylinder 210 as illustrated in FIGURE 10, whereupon the guiding head 202 is driven into alignment with the washer 36 disposed at the end of the washer feed track 188 as shown in broken line detail in FIGURE 10.

The valve 211, as indicated in FIGURE 21, is actuated between two positions by two separate solenoids 211A and 211B. Upon energization of the solenoid 211A, air under pressure is supplied to the cylinder 210, advancing the guiding head 202 to the forward position. Upon energization of the solenoid 211B, the air flow is reversed causing the air cylinder 210 to retract, returning the guiding head 202 to the rest position.

As the head 202 approaches its forward position, in alignment with the washer 36, a microswitch 212, shown schematically in FIGURE 10, is tripped by an arm 218 carried by the block 207. The microswitch 212 energizes a relay 460 (see FIGURES 5 and 21) which energizes solenoids 61A and 61B (see also FIGURES 5 and 21), which in turn, operate clutches for starting the presses 50 and 52, respectively. Simultaneously, the switch 212 energizes a solenoid 214A associated with a solenoid operated air valve 214, shown schematically in FIGURE 14. The valve 214, like the valve 211, is actuated between two positions by separate solenoids 214A and 214B, as indicated in FIGURE 21. Solenoid 214 admits air to the air cylinder 190 and also the aforementioned air cylinder 176. The rod 164 is then actuated by the air cylinder 190 through the guiding head 202, through the washer 36 to an extreme axial position in engagement with a single throw double pole microswitch shown schematically at 215. In this same operation, the rod 164 which initially was suopprted only by the chains 130 and 132 is also driven, as it moves axially, into engagement with a properly aligned clip 136 on the chain 134. The rod 164 strikes the switch 215 after engaging the clip 136.

As shown in FIGURE 21 which will be discussed in detail subsequently, the switch 215 comprises two separate, but simultaneously operated poles 215A and 215B.

With closure of the pole 215A a relay circuit to be described subsequently, is energized with the result that the solenoid operated air valve 211 is reversed. Reversal of the valve 211 causes retraction of the air cylinder 210 and return of the guide 200 to the rest position. As the guide 200 returns to the rest position, the microswitch 212 is disengaged opening the circuit including the solenoid 214A of the valve 214.

The switch 215B is in series with the solenoid 214B of the valve 214 such that as the solenoid 214A is de-energized as described above, the solenoid 214B is energized, reversing the valve 214. With reversal of the valve 214, the air cylinders 176 and 190 return to their rest positions. Ultimately, then, the striking of the switch 215 by the rod 164 causes retraction of the air cylinders 176, 190, and 210.

As the guide 200 returns to its initial or rest position with reversal of the valve 211, a microswitch 216 is momentarily tripped. The microswitch 216 energizes the solenoid 126 associated with the chain drive mechanism through a relay circuit to be described later.

Thus, when a rod 164 is in engagement the switch 215 and simultaneously, the guide 200 has returned to the rest position tripping the microswitch 216, the solenoid 126 is energized such that the chain drive mechanism advances the conveyor assembly. As the assembly advances, the rod 164 disengages the switch 215. This de-energizes the solenoids 214B and 211B, however, the construction of the valves 211 and 214 is such that a change in air flow cannot occur until the solenoids 214A and 211A are energized.

With advancement of the conveyor assembly, the washer 36 secured to the rod 164 moves upwardly, out of the track 188, between the flanges 189 and 191, to the top of the conveyor assembly. A new washer 36 drops into the rod receiving position in the track 188 and the device is ready for a new operating cycle.

The rod 164 which has just received the washer 36 is advanced over the sprockets 94 toward the horizontal upper portion of the main conveyor assembly, the washer 36 remaining between the flanges 189 and 191. A microswitch 217 (see FIGURE 11) positioned between the parallel flanges 189 and 191 is engaged by the washer 36 one unit distance from the first washer receiving position of the rods 164. The microswitch 217 operates as a circuit maker switch in series with the switch 170. That is, the microswitch 217 must be engaged by a washer 36 at the end of each machine cycle before a new machine cycle can be initiated by placing a new rod 164 in engagement with the switch 170. The microswitch thus acts as a detector element to insure that a washer 36 is properly positioned on each rod 164 as the rod 164 is advanced from the first washer engaging position.

Four unit distances removed from the first washer engaging position, that is four cycles later, the rods 164 arrive at a second washer receiving station where the rod 164 receives the second washer 44. The apparatus for performing this operation, illustrated in FIGURES 5, 12, 13, and 14, is similar in principle of operation to the assembly for placing the first washer 36 upon the rod as described hereinbefore. The apparatus will now be described in detail.

Washers 44 are supplied by a conventional rotary feeder hopper 232 through a track 234 in a manner analogous to the supplying of the first washers 36. The washers 44 are conveyed in the track 234 to a position to the left of the first press 50, as viewed in FIGURE 5, at an elevation coplanar with the rods 164 supported by the clips 136 on the upper horizontal portion of the conveyor assembly. A baffle 236 receiving the end of the track 234 prevents misaligned rods 164 retained on the conveyor chains from jamming into the track 234 as the rods 164 are advanced to the position where they are to receive the washers 44.

The end washer 44 in the track 234 is forced into abutment with a cam 240, as shown in FIGURE 13, by the weight of the remaining washers in the upper portion of the track 234. The cam 240 is so positioned that the end washer 44 is aligned with a slot 242 in the baffle 236, the slot 242 having beveled margins which serve to direct a rod 164 into the end washer 44.

The rod 164 is thrust rotatably into the aperture of the washer 44 by an air cylinder 244 illustrated schematically in FIGURE 14. The air cylinder 244 is supported by the arm 133 which also supports the plate 120 of the chain drive mechanism. As described hereinbefore, the air cylinder 244 actuates a shaft 246 through a bearing 248 having a helical slot 250 therein. A pin 252 secured to the shaft 246 rides in the slot 250 to give the shaft 246 a rotary motion. The shaft 246 is provided with a suitable internally fluted head 253, for engaging and rotating the rod 164 in alignment therewith.

The air cylinder 244 is actuated simultaneously with the air cylinder 190 by the operation of the solenoid operated air valve 214, as described hereinbefore. Although the operations involving the first and second washers 36 and 44 have been described separately, the operations actually occur simultaneously, each washer being positioned upon a different rod 164.

When these operations have been completed, the conveyor assembly is actuated to advance the rods 164 a unit distance as described hereinbefore. Before the rods 164 can advance, however, the cam 240 must be displaced to enable the newly attached washer 44 to move away from the track 234. The cam 240 is displaced by a solenoid 254 in series with, and energized simultaneously with the solenoid 126 associated with the conveyor drive assembly. The solenoid 254 is linked to the cam 240 through a pivotally mounted walking beam 256 so that as the solenoid armature is actuated downward, the cam 240 is elevated upward to permit the adjacent washer 44 to pass thereunder. A cam follower wheel 258 minimizes friction forces on the cam 240.

Simultaneously, with the operation of the solenoid 254, a ratchet member 260 retained above the track 234 by a normally energized solenoid 262 is released through the operation of the relay circuit including the solenoids 126 and 254. The ratchet member 260 temporarily stops the next to the last washer 44 in the track 234, as shown in FIGURE 13.

When the conveyor assembly has advanced the necessary distance to actuate the switch 121 (see FIGURE 6), the solenoids 126 and 254 are deenergized and the solenoid 262 is energized through the operation of a relay as will be described subsequently. The cam 240 then drops into its rest position. Simultaneously, the ratchet member 260 is elevated to permit a new washer 44 to roll into the rod receiving position.

As shown in FIGURE 12, the rod 164 having just received the washer 44 carried the washer a unit distance in a slot 264 in a track 266. The washer 44 is carried into engagement with a pivotally mounted trigger 268 provided with a cam surface 270 positioned to actuate a microswitch 272. The microswitch 272 is a circuit making switch in series with the switch 170, such that, unless the washer 44 is properly positioned to actuate the switch 272, a new operating cycle cannot be initiated. That is, both the microswitch 272 and the switch 170 must be closed before a new machine operating cycle can be initiated. The switch 272 therefore halts operation of the device when the washer 44 is not properly positioned on the rod 164.

With additional cycling of the machine, the washer 44 is carried upon the end of the rod 164 along the track 266 into the first press 50. The functional elements of the press 50 are shown in detail in FIGURES 15 and 16.

As clearly shown in FIGURE 16, the rod 164 bearing the washer 44 is carried to a position between upper and lower serrated grippers 280 and 282, the washer 44 being placed between the grippers and an upset 284 situated to the rear of the die assembly. The press 50 provides a station for upsetting the end of the rod 164.

It has already been mentioned in connection with the operation of the guide 200, that as the guide is driven forward by the air cylinder 210, the guide actuates a microswitch 212 which starts the presses 50 and 52, and simultaneously operates the solenoid valve 214 controlling the air cylinders 176, 190, and 244. The solenoid valve 214 also regulates the supply of air to an air cylinder 324, shown in FIGURE 5, mounted alignment with the end of the rod 164 opposite the end projecting into the aforesaid die assembly. Then the solenoid 214A of the valve 214 is energized, the air cylinder 324 is actuated to drive the rod 164 into the die assembly into engagement with the upset 284.

The presses 50 and 52 are each powered through belts 53 driven continuously by a common source of power, which may be an electric motor. The belts 53 engage fly wheels 55, there being one fly wheel 55 for each press 50 and 52, as shown in FIGURE 5. Each fly wheel 55 operates the ram of the associated press 50 or 52 intermittently through a solenoid operated clutch assembly. Each ram is given intermittent reciprocal vertical motion.

In energizing the presses 50 and 52, the microswitch 212 tripped by the guide 200 energizes a pair of solenoids 61A and 61B, shown in FIGURE 5, through a relay as will be described subsequently, there being one solenoid for actuating the clutch associated with each fly wheel 55. The ram associated with each press 50 and 52 moves vertically down as each press is operated. As the ram of the press 52 moves upwardly after completion of the forming operations carried out thereby, a microswitch 59, illustrated in FIGURE 5, is tripped to thereby deenergize the solenoids 61A and 61B. The presses 50 and 52 therefore stop automatically as the ram of the press 52 rises. Since the presses 50 and 52 are kept in approximate synchronization by their common source of power, both presses may be satisfactorily controlled by the single microswitch 59.

The operation of the air cylinders being substantially more rapid than that of the presses, the rod 164 is actuated into proper position in the press 50 before the press 50 has actuated the gripping die element as described hereinbelow.

The press 50 operates a ram 286 carrying the upper die shoe 288 shown in FIGURE 15. A pair of actuators 290 and 292 mounted upon the upper die shoe 288 engage and actuate the compound lower die shoe 294, the construction being such that the actuator 290 first engages the lower die shoe 294. As shown in FIGURE 5, the actuator 290 is bifurcated at its lower end so that the actuator may straddle the rod 164 positioned in engagement with the upset 284. The actuator 290 strikes a toggle assembly including a knee block 296 and a pair of horizontal arms 298 and 299. As the actuator 290 engages the knee block 296, the toggle assembly, which is initially cocked upwardly is driven down to the position illustrated in FIGURE 16, the arms 298 and 299 exerting an endwise force. The arm 299 abuts a rigidly secured stop 300 such that the knee block 296 actually takes an arcuate path in moving downwardly. The arm 298 is driven against a horizontal plunger assembly comprising a first block 302 abutting a beveled cam element 304. The beveled cam element 304 engages a second vertically mounted beveled cam element 306 and drives the element 306 upwardly as the toggle assembly is driven downwardly. The second cam element 306 drives the lower serrated gripper 282 in abutment therewith upwardly to grip the rod 164, as illustrated in FIGURE 16.

As the rod 164 is gripped, the second actuator 292 of the upper die shoe element engages a second vertically oriented plunger 308 having a cam surface 310 engaging a complementary cam surface 320 associated with a horizontally movable block 322. The block 322 actuates the upset 284 horizontally against the end of the rod 164. The upset 284 flattens or upsets the end of the rod 164 causing the washer 44 to be fixedly secured to the rod 164 at a point adjacent the grippers 280 and 282.

It is to be noted that the compound die will not operate properly unless the grippers 280 and 282 engage the rod 164 before the upset 284 is actuated. It is also essential that the gripper 282 has but a limited travel to avoid pinching the rod to the extent that the rod is overly deformed. The toggle assembly, as described, is advantageous in that the toggle assembly can actuate the grippers only a limited amount, yet may undergo a considerable vertical displacement without releasing the grippers. It is comparatively easy to arrange the lengths of the actuators 290 and 292 such that the toggle assembly is engaged first and subsequently the plunger 308 is engaged.

When the operation of the compound die is completed, a spring loaded return pin 312 recessed in the lower die shoe 294 returns the plunger assembly actuated by the toggle assembly insuring release of the rod 164 by the grippers 280 and 282.

After completion of the forming operation within the press 50, the rods 164 are carried by the conveyor assembly through several cycles into the second press 52. As shown in FIGURE 6, flanges 326, 328, and 329 guide the washers 36 to a predetermined intermediate position on the rods 164 as the rods 164 are advanced to the second press 52.

Three machine cycles before the rods 164 arrive at the station within the press 52 where forming operations are initiated, an air cylinder 325 secured to the frame 58 by a bracket 327, as shown in FIGURE 5, positions the rods 164 approximately in the proper position for correct operation of the die elements in the press 52. This air cylinder 325 is regulated by a solenoid operated air valve 372, secured to the upper right portion of the frame 58 as viewed in FIGURE 5, which operates, as will be described subsequently, in response to movement of the ram of the press 52. The air valve 372 is identical in construction and operation to the air valve 214 described hereinbefore.

During each cycle of operation of the machine, the air cylinder 325 is driven forward, then retracted, to position a rod 164 against a suitably positioned stop, not shown, secured to the frame of the press 52 to the rear of the conveyor assembly.

The second press 52 operates a progressive die shown in FIGURES 17, 18, 18A and 19. The progressive die includes adjacent pairs of upper and lower die shoes, the first pair comprising an upper die shoe 330 and a lower die shoe 332, and the second pair comprising an upper die shoe 334 and a lower die shoe 336.

The first pair of die shoes 330 and 332, illustrated in detail in FIGURE 18 and 18A, cooperate to flatten a portion of the rod 164 and simultaneously to stake the washer 36 to the rod in fixed spaced relation to the flattened portion of the rod.

The operative elements of the upper die shoe 330 comprise a stamping element 331 having an off-set stamping head 333, a bifurcated staking element 335 spaced from the stamping element by a spacer 337, and an assembly for flattening the washer 36, which, as shown clearly in FIGURE 18, is initially of conical shape.

The stamping element 331 is secured to the die shoe 330 by a threaded bolt 338. The staking element 335 is retained frictionally in the die shoe 330 between spacers 337 and 339, the spacer 337 abutting the stamping element 331 and the spacer 339 abutting a shoulder 340 provided in the die shoe 330. A knock-out hole 341 extending upwardly through the die shoe 330 and the ram of the press 52 is provided to facilitate removal of the staking element 335 for replacement or repair.

The washer flattening assembly carried by the die shoe 330 includes a first beveled cam element 342 fixedly secured to the die shoe 330 in spaced relation to the staking element 335 and a second beveled cam element 343 mounted for sliding horizontal and vertical movement between the first cam element 342 and the staking element 335. The second cam element 343 is suspended between spaced parallel retaining elements 344, one of which is shown in FIGURE 18. The second cam element 343 is provided with opposite horizontal shoulders 345 adjacent the top thereof which rest upon complementary shoulder portions 346 of the retaining elements 344, the arrangement being such that the cam element 343 when driven upwardly between the retaining elements 344 is also driven laterally toward the staking element 335 through coaction with the fixedly mounted first cam element 342.

A spring loaded plunger 347 recessed in the die shoe 330 and projecting between the retaining elements 344 biases the second cam element 343 away from the die shoe 330 to seat the shoulders 345 upon the shoulder portions 346 of the retaining elements while simultaneously a spring 348 secured at 349 to the second cam element 343 and anchored to the die shoe 330 by a pin 350 biases the second cam element 343 laterally into engagement with the first cam element 342.

The operative elements of the lower die shoe 332 include a stamping element 351, secured by a threaded bolt to the lower die shoe 332 and complementing the stamping element 331, the stamping element 351 being also provided with an off-set stamping head 352; a substantially cylindrical anvil 353 provided with a grooved head 354 for receiving and cradling the rod 164 for staking, the anvil 353 being frictionally retained in a complementary cylindrical cavity in the die shoe 332; and a cam engaging plate 355 secured to the second die shoe 332 by a threaded screw 356. A knock-out hole 357 is provided in the die shoe 332 to facilitate removal of the anvil 353 for repair or replacement.

In operation, a rod 164 is conveyed by the main conveyor assembly to a position between the die elements 330 and 332 in alignment with the stamping elements 331 and 351 and cradled in the anvil 353. The washer 36 carried by the rod 164, having been guided to proper position by the flanges 326, 328, and 329 as described hereinbefore, is disposed adjacent the anvil 353. A rod 164 is in this position at the termination of each operating cycle of the machine. With initiation of a new operating cycle, the press 52 is actuated as described hereinbefore whereupon the die shoe 330 is driven downwardly toward the die shoe 332.

Before the die shoes coact, however, the rod 164 is driven to a predetermined exact alignment in the press 52. The mechanism for aligning the rod 164 in the press 52 will now be described.

As the ram of the press 52 moves downwardly, a microswitch 371, illustrated in FIGURE 5, is tripped by a suitable cam, not shown, carried by the ram. The switch 371 actuates a relay for operating one solenoid 372A of the solenoid operated air valve 372. With energization of the solenoid 372A, air is introduced to the air cylinder 325 which as described hereinbefore approximately positions a rod 164 advancing toward the press 52. The valve 372 also energizes an air cylinder 358, illustrated in FIGURES 5 and 17, which is secured to the frame 58 by a bracket 359.

The air cylinder 358 drives the rod 164 positioned between the die shoes 330 and 332 to a predetermined position against a button 361 positioned in the throat of the press 52 as illustrated in FIGURE 17. This button is movably mounted in a bracket 373 for reasons which will become apparent in the following. As the rod 164 is driven axially by the air cylinder 358, the washer 36 mounted thereon also tends to move axially. FIGURE 18 illustrates an intermediate position of the die shoes 330 and 332 as the ram is advancing downwardly, wherein the second cam element 343 is straddling the rod 164. The cam element 343 provides an abutment for the washer 36 so that as the rod 164 moves axially from the right as viewed in FIGURE 18, the washer 36 is retained between the cam element 343 and anvil 353. In order to prevent binding of the washer 36 on the rod 164 it has been found essential that the cam element 343 straddle the rod 164 beore the rod 164 is driven axially by the air cylinder 358. That is, the cam element 343 must have advanced downwardly far enough that, as the washer 36 engages the surface of the cam element 343, there is sufficient bearing surface that the washer 36 does not tend to twist upon the rod 164.

It is thus apparent that (a) the air cylinder 358 must not be energized before the ram of the press 52 has travelled down a predetermined distance, and (b) the air cylinder 358 must accomplish its forward motion in the short time interval before the stamping and staking elements carried by the downwardly moving die shoe 330 engage the rod 164. The first requirement is met by making the operation of the air valve 372 responsive to the press 52 through the microswitch 371 as described hereinbefore. By this means, the air cylinder 358 is energized only after the ram of the press 52 has travelled downwardly a predetermined distance. In order to meet the second requirement the rod 164 is first approximately positioned by the air cylinder 325, as described hereinbefore, so that the air cylinder 358 need move only a short distance to drive the rod 164 to the stop 361. By making the stroke very short, the rod 164 may be quickly driven into position in the press 52 before the die elements therein coact.

As the die shoe 330 advances downwardly bifurcated guides 363 and 363A carried by the die shoe 330 straddle the rod 164 to insure its proper alignment with the operative elements of the die shoes. Subsequently, the second cam element 343 which is bifurcated to straddle the rod 164 engages the plate 355 of the die shoe 330 and is thereby driven laterally moving the washer 36 towards the anvil 353. Before the washer 36 engages anvil 353, the stamping element 331 and the staking element 355 engage the rod 164 whereby the rod 164 is firmly held between the die shoes 330 and 332. As the die shoe 330 completes its downward travel the rod 164 is flattened between the stamping elements 331 and 351. Simultaneously, the rod 164 is gripped by the staking element 335 while the second cam element 343 flattens the washer 36 against aligned flat surfaces 365 and 367 provided by the staking element 335 and the anvil 353, respectively.

As the staking element 335 grips the rod 164, the diameter of the rod 164 is slightly expanded due to the resultant deformation. As the second cam element 343 flattens the washer 36, the aperture in the washer is constricted. The result is that the washer 36 is compressed tightly and permanently upon the rod 164. The staking and flattening operations also cause a slight axial expansion of the rod 164 such that a length of the rod 164 is gripped tightly between the anvil 353 and stop button 361. In order to release the staked rod 164, the button 361 is permitted to yield slightly by a mechanism which will now be described.

The button 361 is movably mounted in a bracket 373 positioned in the throat of the press 52. An air cylinder 375 mounted behind the button 361 is actuated by the air valve 372 simultaneously with the air cylinders 325 and 358, the air cylinder 375 having a greater thrust than the cylinder 358. As the cylinder 358 drives the rod 164 toward the button 361, the air cylinder 375 drives the button 361 toward the rod. The air cylinder 375 being the stronger of the two cylinders pushes the button 361 to its extreme position in the bracket 373 for ultimate positioning of the rod 164 between the die shoes 330 and 332.

As described hereinbefore, the air valves 211 and 214 are reversed when a rod 164 in the first washer receiving station strikes the switch element 215. As will become more apparent when FIGURE 21 is discussed in detail, the circuitry is such that the air valve 372 is simultaneously reversed, with the result that the air cylinders 325, 358, and 375 are retracted. With retraction of the air cylinder 375, the button 361 is free to retract in the bracket 373, thereby freeing the rod 164 in the press 52.

With separation of the die shoes 330 and 332, the rod 164 is freed as described, and upon subsequent movement of the conveyor assembly, the staked and flattened rod 164 is carried out from between the die shoes 330 and 332 and a new rod 164 is advanced into position therebetween.

While the aforesaid forming operations take place, an additional operation is carried out by the press 52. A steel band 360 supplied by a reel 362 illustrated in FIGURE 5, travels under the frame 58, then upwardly through a metering device 364 to the die elements of the press 52. The metering device 364, secured by a bracket 366 to the frame of the press 52, comprises a master roller 369 cooperating with an idling roller 368 to pinch the band 360 passing therebetween. The master roller is driven through a clutch assembly by an arm 370 engaging a linkage 374. The linkage 374 is secured to the crank shaft of the press on an eccentric 379 such that as the crank shaft makes one revolution, the linkage 374 is driven vertically down, then vertically up, a distance determined by the eccentricity of the connection to the drive shaft. A pair of clutch discs 376 adjacent the arm 370 permit the arm to pivot downwardly without actuating the master roller 369 as the press ram is driven downwardly. As the press ram is returned upwardly, the clutch discs 376 engage the linkage 374 such that the roller 369 is rotated so as to feed a length of the band into the progressive die of the press 52. The length of the band supplied to the die is clearly in proportion to the eccentricity of the connection between the linkage 374 and the crank shaft of the press 52.

The band 360 is fed into a gap between the upper and the lower die elements of the second press 52. The band is first sheared off at the desired length forming the strap 46 by a pair of complementary cutting elements: element 380 associated with the upper die shoe 334 and element 382 associated with the lower die shoe 336. Simultaneously while the strap 46 of the band is sheared off, the strap 46 is bent to a U-shape by a plunger 386 secured to the upper die shoe 334 cooperating with a spring loaded ejector 388 slidably mounted in a well in the lower die shoe 336.

The ejector 388 is biased upwardly by a spring 390 abutting the lower die shoe 336. As the plunger 386 lowers with the upper shoe element 334, the plunger engages the central portion of the strap 46 bending the metal and driving the ejector downwardly. Simultaneously, a tipping element 392 biased downwardly from the upper die shoe 334 by a spring 394 is driven into the upper die shoe by one leg of the cut strap 46. When the ram has reached the lower limit of travel, the strap 46 is bent to the desired U-shape. As the ram rises, the ejector 388 pushes the strap 46 upwardly from the lower die shoe 336 while simultaneously, the tipping element 392 engaging one leg of the U-shaped strap 46 rotates the strap substantially 90 degrees in a counterclockwise direction as viewed in FIGURE 19 to the orientation illustrated in solid line detail therein. As the upswing of the ram is completed, a new strap of the band 360 is fed into the gap between the upper and lower die shoes.

The conveyor assembly advances through three cycles in moving the rod 164 from the staking and flattening station in the press 52 into engagement with the strap 46. It is to be noted that the movement of the rods 164 in the press 52 is substantially normal to the direction of action of the press.

Figure 6:
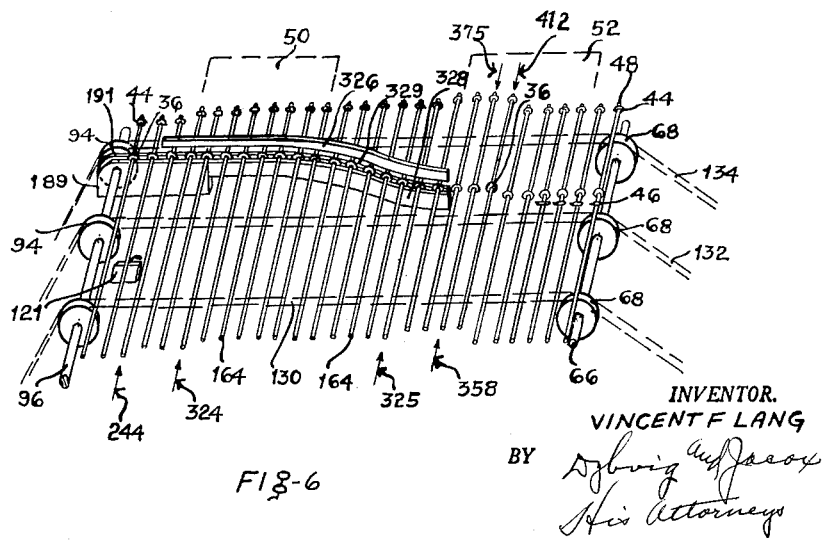
FIGURE 6 is a fragmentary perspective view in reduced scale of the upper portion of the main conveyor assembly of the machine of FIGURE 5.

An air cylinder 412, illustrated schematically in FIGURE 6 is provided in the throat of the press 52 for actuating the rod 164 into proper position for receiving the strap 46. The cylinder 412, which is energized by the air valve 372 along with the air cylinders 325, 358, and 375, is positioned to actuate the rod 164 in the first cycle of machine operation after the rod has been staked and flattened in the press 52. With energization of the air cylinder 412, the rod 164 is driven from the rear of the conveyor assembly forward a short distance, the distance being controlled by the stroke of the air cylinder. Thereafter, the rod 164 is in position to receive the strap 46.

The conveyor assembly moving the rods 164 from left to right as viewed in FIGURE 19 conveys the flattened rod 164 from between the die shoes 330 and 332 into the open end of the U-shaped strap 46 the rod 164 dragging the U-shaped strap into abutment with a blocking pin 400. The conveyor drive stops with the flattened portion of the rod 164 within the U-shaped strap 46 immediately adjacent the blocking pin. The blocking pin 400 is biased upwardly from a stamping element or anvil 401 carried by the lower die shoe 336 by a spring 402. As the next cycle of operation is initiated, the blocking pin 400 is depressed into the stamping element 401 by a projection 404 integral with a stamping element 406 of the upper die shoe. The stamping element 406 is also provided with a recessed portion 408 adapted to receive the flattened portion of the rod 164 and a punch or stamping portion 410 adapted to squeeze the legs of the U-shaped strap 46 together in cooperation with the complementary stamping element 401 so as to wrap the strap tightly around the flattened portion of the rod 164 as illustrated in broken line detail in FIGURE 19.

As the ram approaches the bottom of its travel, the blocking pin 400 is depressed fully within the stamping element 401 by the projection 404. An annular recess 414 in the base portion of the blocking pin 400 engages a solenoid detent 416 there being a biasing spring 418 urging the solenoid armature 420 outwardly of the solenoid coil 422 into the recess 414. The blocking pin 400 is thus unable to rise up from its recessed position in the stamping element 401 until the solenoid coil 422 is energized. When the conveyor drive is actuated at the end of the forming cycle, the rod 164 carrying the strap 46 is carried laterally over the recessed pin 400 and once past the pin 400 trips a lever 424 shown in FIGURE 17, which lever operates a microswitch 425 for energizing the solenoid coil 422 thereby releasing the pin 400. The pin 400 then snaps into position to stop the next U-shaped strap 46 in proper alignment with the stamping element 406.

In this manner, the press 52 provides a station for carrying out the following principal operations: (1) staking the first washer 36 to the rod 164, (2) flattening a portion of the rod, (3) cutting a band of sheet metal to length, and (4) wrapping the cut strap around the rod 164.

Figure 20:
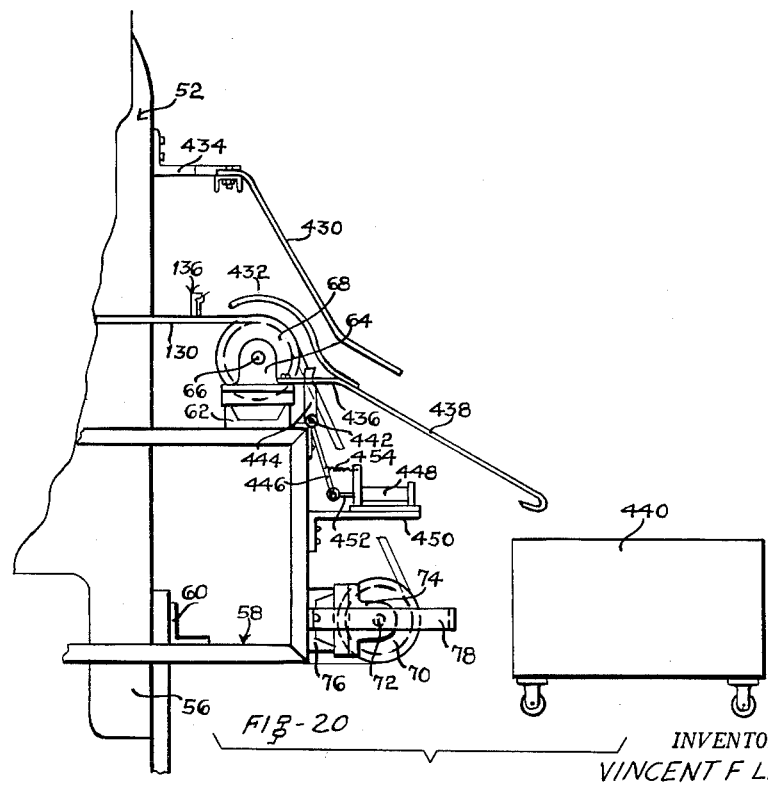
FIGURE 20 is an enlarged fragmentary front elevational view of an ejector apparatus for ejecting fabricated tie rods from the main conveyor assembly.

In a final operation, the rod 164 is ejected from the conveyor clips 136. The ejection apparatus is illustrated in FIGURE 20. As the rods 164 move over the sprockets 68 disposed to the upper right of the frame 58, as viewed in FIGURE 5, the rods pass between spaced pairs of guiding arms 430 and 432. The upper arms 430 are secured by a suitable bracket 434 to the frame of the press 52. The lower arms 432 are supported by straps 436 secured to the U-shaped channel bar 62. The straps 436 support a sheet metal slide 438 for conveying the ejected rods to a bin in 440.

Mounted for rotation on the frame 58 behind the slide 438 is a horizontal shaft 442 carrying three spaced ejector prongs 444 projecting upwardly from the shaft 442. An arm 446 projecting downwardly from the shaft 442 engages an actuator assembly including an air cylinder 448 supported by a bracket 450 secured to the frame 58. When the air cylinder 448 is energized with compressed air, a plunger 452 operated by the air cylinder 448 pivots the arm 446 to rotate the shaft 442. As a consequence, the ejector prongs 444 rotate clockwise as viewed in FIGURE 20 to engage a rod 164 and eject that rod from the conveyor assembly onto the slide 438. When the air supply to the cylinder 448 is cut off, a spring 454 returns the ejector prongs to their rest position.

The air supply to the cylinder 448 is regulated by the solenoid valve 372 which also regulates the air supply to the air cylinders 325, 358, 375, and 412. One formed rod 164 is ejected from the conveyor each time a new unformed rod is placed on the auxiliary conveyor, the ejection occurring after the ram of the press 52 moves downwardly a predetermined distance as described hereinbefore.

Each ejected rod 164 comprises one-half of a completed tie rod 30. The tie rod is completed by passing the ejected rods 164 through the machine once again so as to secure a washer 36, a washer 44 and a strap 46 to the opposite end of the rod.

In the fabrication of the tie rods 30, the spacing between the two washers 36 secured to the tie rod is critical since this spacing ultimately determines the wall thickness of the concrete wall formed with the aid of the tie rods. It is for this reason that rather elaborate means are employed in positioning the rod 164 against the stop 361 for staking in the second press 52. The rods 164 are of an accurate predetermined length initially, then the washers 36 are secured at precise positions with respect to the ends of the rod.

Since, with the described machine design, the rods 164 must pass two times through the machine, it is not considered practical to provide an automatic feed for placing the rods 164 on the auxiliary conveyor assembly. Necessarily, the automatic feed would have to be capable of feeding the half completed tie rods as well as the unworked rods 164.

It is contemplated as an alternative, to provide two rod forming machines, as disclosed herein, operating in sequence along a single conveyor assembly, the first machine fabricating one end of the tie rod and the second machine fabricating the other end of the tie rod. With such an arrangement, unworked rods 164 can be fed into one end of the machine and fully completed tie rods 30 will be ejected from the other end of the machine. An automatic feeding mechanism for feeding unworked rods 164 into the sequentially arranged machines then becomes quite practical.

In order to clarify the synchronous operation of the rod forming machine as described, a circuit diagram is presented in FIGURE 21. With reference to FIGURE 21, reference numerals 211, 214, and 372 refer to the solenoid operated air valves. These valves are conventional toggle action valves each adapted to direct a flow of air under pressure alternately through two separate circuits. The air valve 211, for example, directs air to actuate the air cylinder 210 forward when solenoid 211A is energized. Once the solenoid 211A has been energized, the valve will continue to supply an air pressure to the cylinder 210 holding that cylinder in the forward position even though the solenoid 211A is subsequently deenergized. When the solenoid 211B is energized, provided the solenoid 211A is then deenergized, the valve shifts to divert the air pressure to another circuit supplying air to the opposite end of the air cylinder 210. This retracts the air cylinder 210 to its rest position, where it will remain, even though the solenoid 211B is deenergized, until the solenoid 211A is once again energized.

In an analogous manner, the air valve 214 serves the air cylinders 176, 190, 244, and 324 and the air valve 372 serves the air cylinders 325, 358, 375, 412, and 448. As a convenience in illustrating the mechanical details of the rod forming machine, the hose connections to the air cylinders have not been shown or described in detail, such connections being obvious to those skilled in the art.

Again, with reference to FIGURE 21, three relays are illustrated schematically, the relays being indicated by the reference numerals 460, 462, and 464. These relays are conventional toggle action relays each comprising two separate coil elements and a single pole single throw switch. The operation is such that with energization of one coil of the relay, the switch is driven by that coil into one of its two positions. The switch will remain in that position after the one coil is deenergized until the other coil is energized whereupon the switch will be thrown to the other position.

As illustrated in FIGURE 21, the coil elements of the relays 460, 462, and 464, and the solenoid elements of the air valves 211, 214, and 372 operate between a comparatively low voltage alternating current supply and ground. A 12 volt circuit has been indicated, however it is to be understood that any suitable voltage may be employed in this circuit, provided, of course, a closed circuit is employed when grounding of the circuit through the machine would operate as a hazard to personnel. The solenoids 126, 254, 262, 61A, 61B, and 416 operate on a closed 110 volt alternating current circuit.

The synchronous operation of the rod forming machine will now be reviewed.

FIGURE 21 illustrates the electrical circuit of the rod forming machine at the termination of a rod forming cycle. As described hereinbefore, a new forming cycle is initiated by placing a new unworked rod 164 on the auxiliary conveyor assembly, thereby actuating the switch 170.

Provided the switches 117, 217, and 272 are closed, signalling that the machine successfully negotiated the previous forming cycle, closure of the switch 170 energizes the solenoid 211A in the air valve 211. The valve 211 then directs air under pressure to the air cylinder 210, thereby advancing the guide 200 to its forward position, whereupon the switch 212 is closed.

With closure of the switch 212, solenoid 214A of the air valve 214 is energized. The valve 214 then directs air under pressure to the air cylinders 176, 190, 244, and 324. The air cylinder 176 operates the shuttle mechanism between the auxiliary conveyor assembly and the main conveyor assembly, placing a new rod 164 on the main conveyor assembly. The air cylinder 190 projects a rod 164 through a washer 36 in the first washer receiving station. The air cylinder 244 projects a rod 164 through a washer 44 in the second washer receiving station. The air cylinder 244 projects a rod 164 into position in the first press 50.

Closure of the switch 212 also energizes coil element 460A of relay 460 whereupon the solenoids 61A and 61B are energized. These solenoids actuate clutch mechanisms in the presses 50 and 52, respectively, whereby these presses are started.

As the ram of the press 52 moves downwardly, the switch 371 is closed briefly whereupon solenoid 372A of the air valve 372 is briefly energized. The valve 372 then directs air to the cylinders 325, 358, 375, 412 and 448. The air cylinder 325 approximately positions a rod 164 for entry into the progressive die operated by the press 52. The air cylinder 358 finally positions a rod 164 against the stop button 361 in the second press 52. The air cylinder 375 accurately positions the stop button 361. The air cylinder 412 repositions a rod 164 within the press 52 for engagement with the cut strap 46. The air cylinder 448 ejects a half completed, or fully completed tie rod 30, as the case may be, from the main conveyor assembly into the bin 440.

As the presses 50 and 52 complete their cycle of operation, all forming operations carried out by the rod forming machine are completed and all that remains is to advance the conveyor assemblies and to restore the operative elements of the machine to their rest positions in preparation for another cycle of operations.

Before the presses 50 and 52 have completed their operating cycle, however, the switch 215 is tripped by the rod 164 in the first washer receiving station. With closure of the pole 215A of the switch 215, coil element 462A of relay 462 is energized thereby opening the circuit including the switches 170, 117, 217, and 272, and the coil 211A of the air valve 211. This deenergizes the solenoid 211A. Simultaneously, the solenoid 211B of the air valve 211 is energized whereupon the air valve 211 directs air under pressure so as to retract the air cylinder 210 returning the guide 200 to the rest position. As the guide 200 moves to the rest position, the switch 212 is opened whereupon the solenoid 214A of the air valve 214 is deenergized.

With closure of the pole 215B of the switch 215, the solenoids 214B and 372B of the air valves 214 and 372, respectively, are energized. The air valve 214 then directs air under pressure so as to retract the air cylinders 190, 244, and 324. (The air cylinder 176 is provided with a spring return.) The air valve 372 directs air under pressure so as to retract the air cylinders 325, 358, 375, and 412. (The air cylinder 448 is provided with a spring return.) At this time, all air cylinders have been restored to their rest positions.

As the guide 200 returns to its rest position, switch 216 is closed briefly. This energizes coil element 464A of relay 464 throwing the relay switch so as to denergize solenoid 262 and energize solenoids 126 and 254. With deenergization of solenoid 262, the washers 44 in track 234 are jammed. With energization of solenoid 254, cam element 240 is elevated in the second washer receiving station so as to release the end washer 44 in track 234 providing ultimately for advance of the main conveyor assembly.

With energization of the solenoid 126, the conveyor drive mechanism is actuated and the conveyor assemblies are advanced as described hereinbefore. The timing is such that the rams of the presses 50 and 52 now are in the upswing such that the conveyor assemblies are free to advance. With energization of the solenoid 126, the switch 117 is opened as described hereinbefore. As the conveyor advances, switches 217, 272, and 215 also open.

When the conveyor has advanced a predetermined distance, the switch 121 is closed briefly. With closure of the switch 121, coil element 464B of relay 464 is energized throwing the switch element of relay 464 so as to energize solenoid 262 and deenergize the solenoids 254 and 126. With energization of the solenoid 262 and deenergization of the solenoid 254, a washer 44 is positioned in the second washer receiving station in readiness for the next machine operating cycle.

With deenergization of the solenoid 126, the T-bar 129 in the drive mechanism is permitted to engage the drum 119 preparatory to stopping the conveyor assemblies when they have travelled one unit distance. The switch 117 remains open, however.

Simultaneously with closure of the switch 121, coil element 462B of relay 462 is energized throwing the switch element of relay 462 so as to close the circuit including the solenoid 211A of air valve 211 and the switch 170, which is now open and will remain open until a new rod 164 is placed upon the conveyor assembly. Switches 117, 217, and 272 are also open in this circuit so that a new operating cycle cannot be initiated until these switches are closed.

Before the conveyor assemblies complete their advance through one unit distance, the ram of the press 52 rises sufficiently that the switch 59 is closed briefly. With closure of the switch 59, coil element 460B of relay 460 is energized whereupon the switch element of relay 460 is thrown so as to deenergize the solenoids 61A and 61B thereby stopping both presses 50 and 52.

Also before the conveyor assemblies have completed their advance through one unit distance, the switch 425 is briefly closed thereby energizing briefly solenoid 416 which releases the stopping pin 400 in the progressive die operated by the press 52. This provides for proper positioning of the U-shaped strap 46 in the press 52 preparatory to the next machine cycle.

Finally, as the conveyor assemblies complete their advance through one unit distance switch 217 closes signifying correct operation of the first washer receiving station and switch 272 closes signifying correct operation of the second washer receiving station.

As T-bar 129 drops into the notch in drum 119 in the conveyor drive mechanism, the conveyor assemblies are halted after travelling one unit distance. As the T-bar 129 drops into place, switch 117 closes and the machine is in position for a new operating cycle.

It is recognized that circuit arrangements other than the specific circuit illustrated in FIGURE 21 may be employed for synchronization of the rod forming machine of this invention. The circuit illustrated, is thus merely suggestive of one type that may be successfully employed.

Although the preferred embodiment of the method and apparatus has been described, it will be understood that within the purview of this invention various changes may be made in the form, details, proportion and arrangement of parts, the combination thereof and mode of operation, which generally stated consist in a method and apparatus capable of carrying out the objects set forth, as disclosed and defined in the appended claims.

Having thus described my invention, I claim:

1. A machine for fabricating tie rods comprising, in combination, a punch press, first and second die shoes cooperating to support a progressive die operated reciprocally by said press, means for actuating said press so as to bring said die shoes momentarily into coaction, means responsive to movement of said press for feeding a metal band between said die shoes, means carried by said die shoes for cutting said band to a predetermined length in response to operation of said press, means carried by said die shoes for bending the cut metal band into a U-shape in response to operation of said press, means carried by said die shoes for rotating said U-shaped band to a predetermined position between said die shoes as the die shoes separate, conveyor means advancing in a direction normal to the direction of action of said press for moving a rod to a predetermined position between said die shoes in engagement with the U-shaped band, and means carried by said die shoes for stamping the U-shaped metal band so as to clamp the band to the rod.

2. A device for securing a metal band to a rod comprising a punch press, first and second die shoes cooperating to provide a progressive die operated reciprocally by said press, means for actuating said press so as to bring said die shoes momentarily into coaction then to separate the die shoes, a cutting element, a plunger, and a stamping element mounted successively and in spaced relation on said first die shoe, a tipping element mounted for sliding movement between said cutting element and said plunger, yielding means biasing said tipping element away from said first die shoe, complementary cutting and stamping elements mounted in spaced relation on said second die shoe, an ejector element mounted for sliding movement between said complemetary cutting and stamping elements, yielding means biasing said ejector element away from said second die shoe, the tipping element, plunger element, and stamping element carried by said first die shoe being aligned respectively with the cutting element, ejector, and stamping element carried by said second die shoe, means responsive to operation of said press for feeding a metal band between said die shoes to a position between said plunger element and said ejector element, said cutting elements cutting the band to a predetermined length in response to operation of said press while simultanously said plunger depresses the cut band against said ejector element so as to bend the band to a U-shape, one leg of said U-shaped band depressing said tipping element inwardly of said first die shoe, said ejector element and said tipping element cooperating to tip the U-shaped band to a predetermined position between said die shoes as the die shoes separate, said U-shaped band resting upon one of said die shoes after the die shoes separate, conveyor means for conveying a rod between said die shoes into the open end of said U-shaped band and between said stamping elements, said stamping elements engaging said U-shaped band and stamping the ends of said band together so as to clamp the band to the rod in response to operation of the press.

3. The device according to claim 2 including means for positioning the U-shaped band properly between the stamping elements of said die shoes, said means including a pin mounted for sliding movement in a cavity provided therefor in one of said stamping elements, yielding means biasing said pin out of said cavity so as to cause the pin to project between the stamping elements, said pin being driven inwardly of said cavity by the opposing stamping element as the stamping elements coact, latch means for engaging said pin and retaining said pin within the cavity as the stamping elements separate, thereby permitting the band carrying rod to pass between the stamping elements upon separation of the die shoes, and means responsive to movement of the band carrying rod for releasing said latch means so as to restore the pin to its initial position projecting between said stamping elements.

4. In a progressive die comprising a plurality of forming elements mounted on opposing die shoes for conjoint action, means for cutting a metal band to predetermined length, means for simultaneously bending the cut band to a U-shape, and means to rotate the U-shaped band to a predetermined position within the die.

5. A progressive die comprising a plurality of forming elements mounted on opposing die shoes for conjoint action, said progressive die operating in combination with a conveyor assembly for conveying rods therethrough in a direction substantially normal to the direction of action of said die, said progressive die including means for cutting a metal band to predetermined length, means for bending the band to a U-shape, means for rotating the U-shaped band substantially 90 degrees to a predetermined position for receiving a rod carried by said conveyor assembly, and means for stamping the band so as to secure the band to the rod.

6. The progressive die according to claim 5 including reciprocally mounted stop means having an operative position for properly positioning the U-shaped band for stamping and an inoperative position, latch means for restraining the stop means in the inoperative position after the stamping operation, and means responsive to movement of the conveyor assembly for releasing said latch means so as to return said stop means to the operative position.

7. In a machine for fabricating tie rods including a progressive die assembly, a press for operating said progressive die assembly, conveyor means for conveying rods successively through said progressive die assembly in a direction normal to the direction of action of said die assembly, and means responsive to operation of said press for feeding a length of a sheet metal band into said progressive die assembly, the improvement wherein said progressive die assembly includes means for cutting said sheet metal band to a predetermined length, means for simultaneously bending the cut band into a U-shape, means for tipping the U-shaped band to a predetermined position within said progressive die assembly to receive a rod conveyed thereto, said conveyor means advancing said rod into the U-shaped band in said predetermined position, and means for stamping said U-shaped band so as to wrap the band firmly around the rod.

8. In a progressive die including opposing relatively movable die shoes, complementary cutter means carried by said die shoes for cutting a metal band to a predetermined length upon movement of said die shoes one toward the other, means carried by said die shoes for simultaneously bending the predetermined length of band to a substantial U-shape, and means coacting between said die shoes for tipping the U-shaped band to a predetermined position as the die shoes separate.

9. A progressive die including opposed relatively movable die shoes, complementary cutting elements carried by said die shoes, a plunger element secured to one of said die shoes in spaced relation to the cutting element thereon, the other die shoe having a well for receiving said plunger element, a first ejector member slidably mounted in said well, spring means biasing said ejector outwardly of said well, a second ejector member slidably positioned between the plunger element and the cutting element on said one die shoe, and spring means biasing said second ejector outwardly from between said cutting element and said plunger element, the construction and arrangement being such that a strip of material placed between said die shoes will be cut to length by said cutting element, bent to a substantial U-shape by said plunger, and tipped in a predetermined direction by said ejector members upon engagement and separation of said die shoes.

10. A progressive die for operation in combination with a conveyor assembly for conveying rods thereto, said progressive die including means for cutting a metal band to predetermined length, means for bending the band to a U-shape, means for tipping the U-shaped band to a predetermined position for receiving a rod carried by said conveyor assembly, reciprocally mounted stop means having an operative position for properly positioning the U-shaped band for stamping and an inoperative position, means for stamping the band so as to secure the band to the rod, latch means for restraining the stop means in the inoperative position after the stamping operation, and means responsive to movement of the conveyor assembly for releasing said latch means so as to return said stop means to the operative position.

11. A progressive die for forming a strip of material including opposed relatively movable die shoes, complementary cutting elements carried by said die shoes for severing said strip on approach of said die shoes one toward the other, a plunger element secured to one of said die shoes in spaced relation to the cutting element thereon, the other die shoe having a well for receiving said plunger element, said plunger element and said well being adapted to form the severed strip of material to a U-shape upon approach of said die shoes one toward the other, a first ejector member slidably mounted in said well, yielding means biasing said ejector member outwardly of said well so as to eject said U-shaped strip from said well upon separation of said die shoes, a second ejector member slidably positioned adjacent said plunger element on said one die shoe to engage one leg of said U-shaped strip as it is formed by movement of said plunger element into said well, and means biasing said second ejector member outwardly of said one die shoe, the construction and arrangement being such that said second ejector member cooperates with said first ejector member to rotate said U-shaped strip in a predetermined direction as the die shoes separate.

12. A progressive die for forming a strip of material, said die including opposed relatively movable die shoes, a plunger element secured to one of said die shoes, the other die shoe having a well for receiving said plunger element, said plunger element and said well being adapted to form said strip of material to a U-shape upon approach of said die shoes one toward the other, a first ejector member slidably mounted in said well, yielding means biasing said ejector member outwardly of said well so as to eject said U-shaped strip from said well upon separation of said die shoes, a second ejector member slidably positioned adjacent said plunger element on said one die shoe to engage one leg of said U-shaped strip as it is formed by movement of said plunger into said well, and yielding means biasing said second ejector member outwardly from said one die shoe, the construction and arrangement being such that said second ejector member cooperates with said first ejector member to rotate said U-shaped strip to a predetermined position as the die shoes separate.

References Cited in the file of this patent

UNITED STATES PATENTS

| | | |
|---|---|---|
| 728,118 | Lehmann | May 12, 1903 |
| 1,935,742 | Hager | Nov. 21, 1933 |
| 1,981,162 | Brown | Nov. 20, 1934 |
| 2,276,050 | Leighton | Mar. 10, 1942 |
| 2,350,530 | Pickard | June 6, 1944 |
| 2,391,891 | Frankel | Jan. 1, 1946 |
| 2,436,806 | Hunt | Mar. 2, 1948 |
| 2,603,988 | Nowak | July 22, 1952 |
| 2,642,176 | De Burgh | June 16, 1953 |
| 2,673,345 | Berg | Mar. 30, 1954 |
| 2,683,999 | Hammond | July 20, 1954 |
| 2,686,588 | Hoban | Aug. 17, 1954 |
| 2,804,621 | Winberg | Sept. 3, 1957 |

UNITED STATES PATENT OFFICE
CERTIFICATE OF CORRECTION

Patent No. 3,031,672                           May 1, 1962

Vincent F. Lang

It is hereby certified that error appears in the above numbered patent requiring correction and that the said Letters Patent should read as corrected below.

Column 1, line 30, after "provide" insert -- in --; line 49, for "section. Illustrating" read -- section, illustrating --; same column 1, line 71, for "fabrication" read -- fabricating --; column 8, line 2, for "supoprted" read -- supported --; column 11, line 63, for "FIGURE" read -- FIGURES --; column 13, line 11, for "from the right" read -- from left to right --.

Signed and sealed this 11th day of December 1962.

(SEAL)
Attest:

ERNEST W. SWIDER
Attesting Officer

DAVID L. LADD
Commissioner of Patents